US011366861B1

(12) United States Patent
Gustafson et al.

(10) Patent No.: US 11,366,861 B1
(45) Date of Patent: Jun. 21, 2022

(54) MODELING CONFORMANCE TO THEMATIC CONCEPTS

(71) Applicant: Noonum, Inc., Seattle, WA (US)

(72) Inventors: Steven Matt Gustafson, Sammamish, WA (US); Shankar Vaidyanathan, Redmond, WA (US)

(73) Assignee: Noonum, Inc., Seattle, WA (US)

(*) Notice: Subject to any disclaimer, the term of this patent is extended or adjusted under 35 U.S.C. 154(b) by 0 days.

(21) Appl. No.: 17/186,774

(22) Filed: Feb. 26, 2021

(51) Int. Cl.
*G06F 16/00* (2019.01)
*G06F 16/906* (2019.01)
*G06F 16/908* (2019.01)
*G06F 16/901* (2019.01)

(52) U.S. Cl.
CPC ........ *G06F 16/906* (2019.01); *G06F 16/908* (2019.01); *G06F 16/9024* (2019.01)

(58) Field of Classification Search
CPC ... G06F 16/9024; G06F 16/906; G06F 16/908
See application file for complete search history.

(56) References Cited

U.S. PATENT DOCUMENTS

| | | | |
|---|---|---|---|
| 6,021,397 A | 2/2000 | Jones et al. | |
| 6,484,152 B1 | 11/2002 | Robinson | |
| 7,051,022 B1* | 5/2006 | Faisal | G06F 16/35 |
| 8,019,670 B2 | 9/2011 | Madhavan et al. | |
| 8,285,619 B2 | 10/2012 | Herz et al. | |
| 8,443,005 B1 | 5/2013 | Goldman et al. | |
| 8,712,897 B2 | 4/2014 | Lee et al. | |
| 10,198,491 B1* | 2/2019 | Semturs | G06F 16/951 |
| 2007/0094210 A1 | 4/2007 | Craig et al. | |
| 2007/0233656 A1* | 10/2007 | Bunescu | G06F 40/295 |
| 2009/0119312 A1 | 5/2009 | Pryde et al. | |
| 2013/0124542 A1 | 5/2013 | Lee et al. | |
| 2013/0127862 A1 | 5/2013 | Grewal | |
| 2014/0195518 A1* | 7/2014 | Kelsey | G06F 16/367 |
| | | | 707/722 |
| 2015/0310174 A1 | 10/2015 | Coudert et al. | |
| 2016/0050314 A1 | 2/2016 | Homma et al. | |
| 2016/0132808 A1 | 5/2016 | To et al. | |
| 2016/0379120 A1* | 12/2016 | Merdivan | G06F 16/3329 |
| | | | 706/46 |

(Continued)

OTHER PUBLICATIONS

Markowitz, Harry, "Portfolio Selection", The Journal of Finance, 1952, vol. 7(1), pp. 77-91.

(Continued)

*Primary Examiner* — Diedra McQuitery
(74) *Attorney, Agent, or Firm* — John W. Branch; Branch Partners PLLC

(57) ABSTRACT

Embodiments are directed to managing data using network computers. A data graph may be provided based on knowledge graphs and information provided by data sources. Concepts and entities may be provided based on the data graph. Scoring models may be determined based on the concepts and the entities. Thematic scores for the entities may be generated based on the scoring models and the data graph such that the thematic scores include values that quantify each relationship between the concepts and the entities and such that an entity with a higher thematic score value for a concept has a relationship strength value that exceeds another relationship strength value for another entity with a lower thematic score value for the concept. A report that includes the thematic scores, the entities, and the concepts may be provided.

24 Claims, 20 Drawing Sheets

(56) References Cited

U.S. PATENT DOCUMENTS

| | | | |
|---|---|---|---|
| 2017/0076206 A1* | 3/2017 | Lastras-Montano | G06F 16/9024 |
| 2017/0242917 A1 | 8/2017 | Kenthapadi et al. | |
| 2018/0053255 A1 | 2/2018 | Valdyanathan et al. | |
| 2019/0026438 A1* | 1/2019 | Ma | G16H 50/30 |
| 2019/0057310 A1* | 2/2019 | Olmstead | G06F 40/211 |
| 2019/0065248 A1 | 2/2019 | Ravindran et al. | |
| 2019/0303395 A1* | 10/2019 | Flood | G06F 16/367 |
| 2020/0075139 A1 | 3/2020 | Master et al. | |
| 2020/0250562 A1* | 8/2020 | Bly | G06N 5/022 |
| 2020/0342016 A1 | 10/2020 | Morris | |
| 2021/0073654 A1* | 3/2021 | Ameri | G06F 16/285 |

OTHER PUBLICATIONS

Merton, Robert, "An Analytic Derivation of the Efficient Portfolio Frontier", Journal of Financial and Quantitative Analysis, 1972, vol. 7(4), pp. 1851-1872.

Low, Rand K.Y. et al., "Enhancing Mean-Variance Portfolio Selection by Modeling Distributional Asymmetries", SSRN, https://ssrn.com/abstract=2259073, 2013, pp. 1-34.

Taleb, Nassim N., The Black Swan: The Impact of the Highly Improbable, Random House, 2007, pp. 1-401.

Fama, Eugene F., "Common Risk Factors in the Returns on Stocks and Bonds", Journal of Financial Economics, 1993, vol. 33, pp. 3-56.

Fama, Eugene F., "The Cross-Section of Expected Stock Returns", The Journal of Finance, 1992, vol. 47(2), pp. 427-465.

Fama, Eugene F., "A five-factor asset pricing model", Journal of Financial Economics, 2015, vol. 116, pp. 1-22.

Office Communication for U.S. Appl. No. 17/118,424 dated Feb. 24, 2021, pp. 1-32.

Office Communication for U.S. Appl. No. 17/118,424 dated Jun. 25, 2021, pp. 1-31.

Office Communication for U.S. Appl. No. 17/118,424 dated Jun. 30, 2021, pp. 1-3.

Office Communication for U.S. Appl. No. 17/118,424 dated Dec. 8, 2021, pp. 1-20.

* cited by examiner

MODELING CONFORMANCE TO THEMATIC CONCEPTS

TECHNICAL FIELD

The present invention relates generally to data management, and more particularly, but not exclusively, to modeling organization conformance to thematic concepts.

BACKGROUND

The ever-increasing amount of available information associated with the messaging, behavior, performance, or the like, provides business analysts an enormous amount of information to compare or analyzes varies entities, such as, businesses or organizations. In many cases, information from many public or private sources may be easily available for many different organizations. Accordingly, the available energy may provide near limitless opportunity to research the interests or activities of various organizations. Likewise, this information enables deep or complex analysis of markets or industries and their constituent organizations. However, the volume of available information and the numerous sources of information may require significant time or effort for analysts to digest or otherwise understand. In many cases, it may be difficult for individual or groups of analysts to identify relevant information, let alone reading and understanding it. Accordingly, analysts are often required to rely on personal knowledge or experience to guide their research or analysis rather than obtaining or reviewing much of the available information. In some cases, analysts may rely on instinct or hunches because they lack the time or resources to review the nearly limitless supply of information that may be continuously generated. Thus, it is with respect to these considerations and others that the present invention has been made.

BRIEF DESCRIPTION OF THE DRAWINGS

Non-limiting and non-exhaustive embodiments of the present innovations are described with reference to the following drawings. In the drawings, like reference numerals refer to like parts throughout the various figures unless otherwise specified. For a better understanding of the described innovations, reference will be made to the following Detailed Description of Various Embodiments, which is to be read in association with the accompanying drawings, wherein.

DETAILED DESCRIPTION OF VARIOUS EMBODIMENTS

Figure 1:
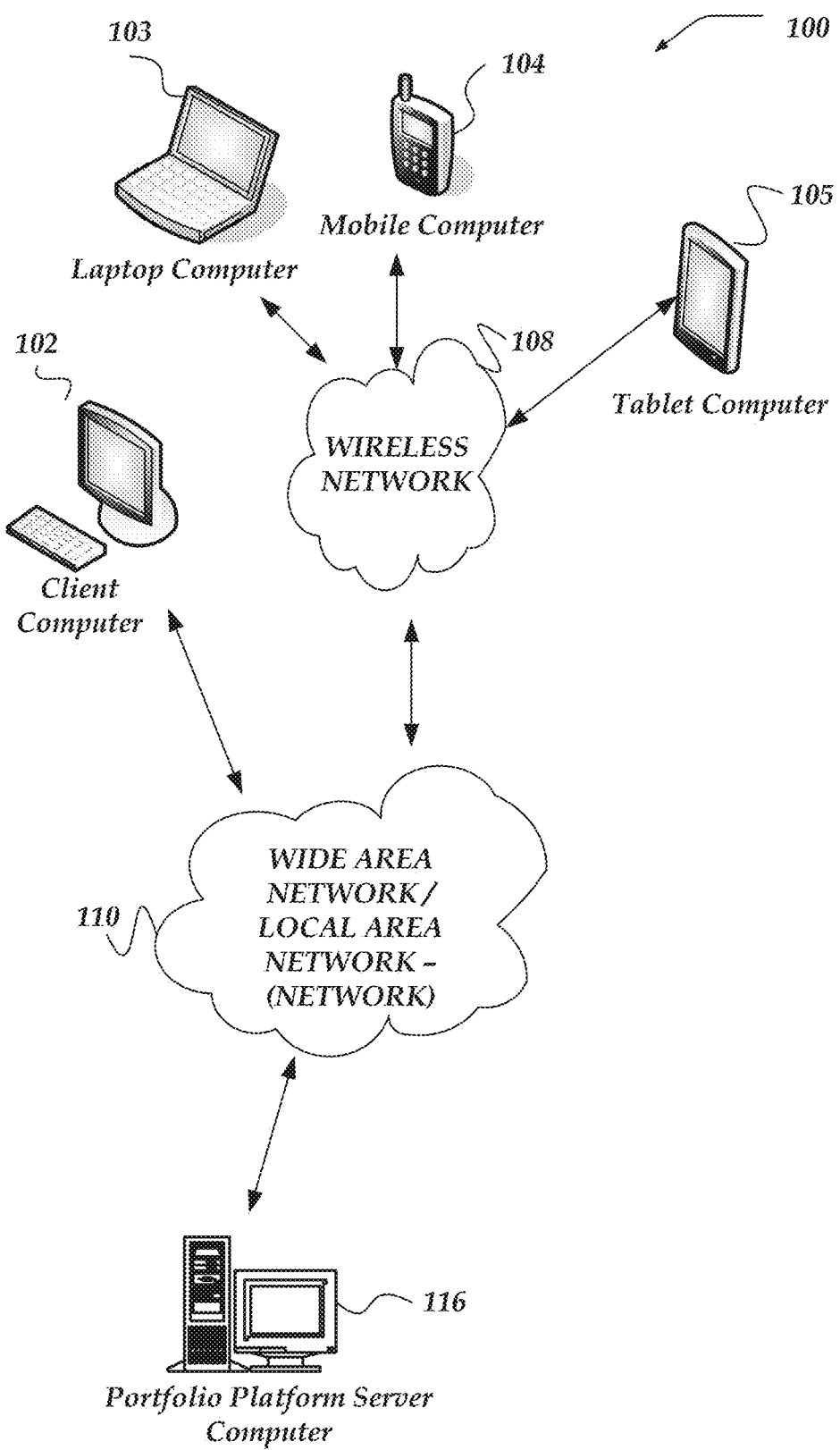
FIG. 1 illustrates a system environment in which various embodiments may be implemented.

Various embodiments now will be described more fully hereinafter with reference to the accompanying drawings, which form a part hereof, and which show, by way of illustration, specific exemplary embodiments by which the invention may be practiced. The embodiments may, however, be embodied in many different forms and should not be construed as limited to the embodiments set forth herein; rather, these embodiments are provided so that this disclosure will be thorough and complete, and will fully convey the scope of the embodiments to those skilled in the art. Among other things, the various embodiments may be methods, systems, media or devices. Accordingly, the various embodiments may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

For example, embodiments, the following terms are also used herein according to the corresponding meaning, unless the context clearly dictates otherwise.

As used herein the term, "engine" refers to logic embodied in hardware or software instructions, which can be written in a programming language, such as C, C++, Objective-C, COBOL, Java™, PHP, Perl, JavaScript, Ruby, VBScript, Microsoft .NET™ languages such as C#, or the like. An engine may be compiled into executable programs or written in interpreted programming languages. Software engines may be callable from other engines or from themselves. Engines described herein refer to one or more logical modules that can be merged with other engines or applications, or can be divided into sub-engines. The engines can be stored in non-transitory computer-readable medium or computer storage device and be stored on and executed by one or more general purpose computers, thus creating a special purpose computer configured to provide the engine.

As used herein the term "data source" refers to a service, system, or facility that may provide data to a data ingestion platform. Data sources may be local (e.g., on premises databases, reachable via a local area network, or the like) or remote (e.g., reachable over a wide-area network, remote endpoints, or the like). In some cases, data sources may be streams that provide continuous or intermittent flows of data to a data ingestion platform. Further, in some cases, data sources may be local or remote file systems, document management systems, cloud-based storage, or the like. Data sources may support one or more conventional or customer communication or data transfer protocols, such as, TCP/IP, HTTP, FTP, SFTP, SCP, RTP, or the like. In some cases, data sources may be owned, managed, or operated by various organizations that may provide data to a data ingestion platform. In some instances, data sources may be public or private websites or other public or private repositories that enable third parties to access hosted content.

As used herein the term "raw data source" refers to a data source that generally provides its data as is, or otherwise with little coordination with a data ingestion platform. In most cases, raw data sources provide data that may require additional parsing or processing before it is usable by a portfolio platform.

As used herein the term "raw data" refers to data provided by a raw data source. Raw data may include structured or unstructured data, documents, streams, or the like. Provided data may be considered as raw because the data source may provide the data in a form or format "as-is."

As used herein the terms "organization," or "entity" refer to the various businesses, companies, associations, institutions, partnerships, states, agencies, or the like, that may be analyzed or evaluated based on thematic scores, or the like.

As used herein the term "concept graph" refers to one or more data structures or data models that include objects that may represent concepts and their respective relationships. Concept graphs may be based on or represent one or more ontologies. Ontologies or taxonomies represented in concept graphs may be pre-defined, custom, or portions of existing ontologies or taxonomies, or combinations thereof. Ontologies or taxonomies may be determined by one or more of subject matter experts and/or machine language processing of information from one or more data sources. Also, each instance of a concept may be determined by one or more associations of information from one or more data sources, such as a field of a data object, a portion of a document, a row of a database table, or the like. Further, concept graphs represent the logical organization or relationships of concepts. Each node of a concept graph may be associated with one or more other concepts.

As used herein the term "entity graph" refers to one or more data structures or data models that include objects that may represent entities or organizations and their respective relationships with other entities or organizations. Each node of an entity graph may be associated with one or more different entities or organizations. Also, nodes in entity graphs may be associated with various attributes of each represented entity or organization. Each node in an entity graph may be considered to represent individual instances of entities or organizations rather than classes or types of entities or organizations.

As used herein the term "data graph" refers to one or more data structures or data models that include objects that may represent a synthesis of information from concept graphs and organization graphs.

As used herein the term "theme" refers to a high-level concept that encompasses one or more lower-level concepts. In some cases, themes may refer to areas of technology, industry domains, social structures, or the like. Examples of themes may include 5G telecommunications, petroleum, green energy, sustainability, medicine, elder care, or the like. In some cases, a concept may be associated with more than one theme.

As used herein the term "compound theme," or "meta-theme" refers to a theme comprised of one or more other themes. For example, a compound theme of environmental protections may include sub-themes of solar power, wind power, green buildings, wildlife conservation, or the like.

As used herein the term "query" refers to commands or sequences of commands that are used for querying, searching or retrieving data from a modeling system. Queries generally produce a result or results depending on the form and structure of the particular query string. Graph Query Language (GraphQL) is a well-known query language often used to form queries for graph-based databases. However, the various embodiments are not limited to using GraphQL-like formatting for query strings. Accordingly, other well-known query languages or custom query languages may be employed.

As used herein the term "ingestion model" refers one or more data structures that encapsulate the data, rules, machine learning models, machine learning classifiers, natural language processing instructions, or instructions that may be employed to match or map information provided by data sources to one or more knowledge graphs. Ingestion models may include various components, such as, one or more machine learning based classifiers, heuristics, rules, pattern matching, conditions, or the like, that may be employed to match or map information to one or more knowledge graphs. Different ingestion models may be provided for different categories of information. For example, one ingestion model may be directed to ingesting information included in press releases while another ingestion model may be directed to ingesting information included in formal public disclosures, such as, earning calls, merger notices, or the like.

As used herein the term "portfolio model" refers one or more data structures that encapsulate the data, rules, machine learning models, machine learning classifiers, or instructions that may be employed to determine one or more organizations or entities that may be correlated with one or more concepts or themes.

As used herein the term "thematic score" refers to one or more data structures that include data or metadata that quantify how closely one or more organizations correlate with concepts or themes.

As used herein the term "scoring model" refers one or more data structures that encapsulate the data, rules, machine learning models, machine learning classifiers, or instructions that may be employed to generate thematic scores.

As used herein the terms "organization score," or "entity score" refer a score that represents how well an organization or entity conforms to the concepts of a theme. It reflects a portion of the thematic score that may be attributed to actions, communications, or the like, associated with the organization or entity itself. The criteria for computing organization scores, as well as their level of contribution to thematic scores may be determined by scoring models used to evaluate the organizations.

As used herein the term "network score" refers a score that represents the prominence the concepts of a theme within organizations or entities that may be related to the organization of interest. The criteria for computing network scores, as well as their level of contribution to the overall thematic scores may be determined by scoring models used to evaluate the organization.

As used herein the term "general score" refers a score that may represent the interest or prominence of a theme or concept in the wider public or society. The criteria for computing general scores, as well as their level of contribution to thematic scores may be determined by scoring models used to evaluate the organization.

As used herein the term "configuration information" refers to information that may include rule based policies, pattern matching, scripts (e.g., computer readable instructions), or the like, that may be provided from various sources, including, configuration files, databases, user input, built-in defaults, plug-ins, extensions, or the like, or combination thereof.

The following briefly describes embodiments of the invention in order to provide a basic understanding of some aspects of the invention. This brief description is not intended as an extensive overview. It is not intended to identify key or critical elements, or to delineate or otherwise narrow the scope. Its purpose is merely to present some concepts in a simplified form as a prelude to the more detailed description that is presented later.

Briefly stated, various embodiments are directed to managing data using one or more network computers. In one or more of the various embodiments, a data graph may be provided based on one or more knowledge graphs and information provided by one or more data sources.

In one or more of the various embodiments, one or more concepts and one or more entities may be provided based on the data graph. In one or more of the various embodiments, providing the one or more entities may include providing one or more portfolios that include the one or more entities such that each included entity contributes one or more partial thematic scores based on the one or more scoring models.

In one or more of the various embodiments, one or more scoring models may be determined based on the one or more concepts and the one or more entities.

In one or more of the various embodiments, one or more thematic scores for the one or more entities may be generated based on the one or more scoring models and the data graph such that the one or more thematic scores include one or more values that quantify each relationship between the one or more concepts and the one or more entities and such that an entity with a higher thematic score value for a concept has a relationship strength value that exceeds another relationship strength value for another entity with a lower thematic score value for the concept. In one or more of the various embodiments, generating the one or more thematic scores may include traversing the data graph to determine the one or more entities that are related to the one or more concepts based on one or more relationships represented in the data graph such that the one or more thematic scores are based on the strength of relationship between each entity and each concept.

In one or more of the various embodiments, a report that includes the one or more thematic scores, the one or more entities, and the one or more concepts may be provided.

In one or more of the various embodiments, providing the one or more concepts may include: providing a theme based on an anchor concept theme; and traversing a concept graph to determine the one or more concepts based on one or more relationships between the one or more concepts and the anchor concept such that each relationship between the anchor concept and the one or more concepts may be associated with each relationship strength value that exceeds a threshold value.

In one or more of the various embodiments, generating the one or more thematic scores for the one or more entities may include: determining an entity score for each entity based on the entity and its relationship with the one or more concepts; determining a network score for each entity based on the entity and one or more other entities that are related to the one or more entities such that the network score may be based on one or more relationships between the one or more other entities and the one or more concepts; determining a general score for each entity based on one or more of a news report, curated data set, social media feed, periodical article feed, government agency disclosure, government agency submission, or scientific paper; and employing the one or more scoring models to combine the entity score, the network score, and general score into one or more thematic score values.

In one or more of the various embodiments, providing the report that includes the one or more thematic scores may include displaying a value that quantifies a strength of each relationship between the one or more entities and the one or more concepts.

In one or more of the various embodiments, providing the one or more thematic scores, further comprises: employing the one or more scoring models to provide one or more sub-scores for each thematic score based on a weighting that corresponds to a contribution of the one or more sub-scores to the one or more thematic scores; and generating one or more score containers that each include one or more values for the one or more weighted sub-scores that correspond to the one or more entities.

Illustrated Operating Environment

FIG. 1 shows components of one embodiment of an environment in which embodiments of the invention may be practiced. Not all of the components may be required to practice the invention, and variations in the arrangement and type of the components may be made without departing from the spirit or scope of the invention. As shown, system 100 of FIG. 1 includes local area networks (LANs)/wide area networks (WANs)-(network) 110, wireless network 108, client computers 102-105, portfolio platform server computer 116, or the like.

At least one embodiment of client computers 102-105 is described in more detail below in conjunction with FIG. 2. In one embodiment, at least some of client computers 102-105 may operate over one or more wired or wireless networks, such as networks 108, or 110. Generally, client computers 102-105 may include virtually any computer capable of communicating over a network to send and receive information, perform various online activities, offline actions, or the like. In one embodiment, one or more of client computers 102-105 may be configured to operate within a business or other entity to perform a variety of services for the business or other entity. For example, client computers 102-105 may be configured to operate as a web server, firewall, client application, media player, mobile telephone, game console, desktop computer, or the like. However, client computers 102-105 are not constrained to these services and may also be employed, for example, as for end-user computing in other embodiments. It should be recognized that more or less client computers (as shown in FIG. 1) may be included within a system such as described herein, and embodiments are therefore not constrained by the number or type of client computers employed.

Computers that may operate as client computer 102 may include computers that typically connect using a wired or wireless communications medium such as personal computers, multiprocessor systems, microprocessor-based or programmable electronic devices, network PCs, or the like. In some embodiments, client computers 102-105 may include virtually any portable computer capable of connecting to another computer and receiving information such as, laptop computer 103, mobile computer 104, tablet computers 105, or the like. However, portable computers are not so limited and may also include other portable computers such as cellular telephones, display pagers, radio frequency (RF) devices, infrared (IR) devices, Personal Digital Assistants (PDAs), handheld computers, wearable computers, integrated devices combining one or more of the preceding computers, or the like. As such, client computers 102-105 typically range widely in terms of capabilities and features. Moreover, client computers 102-105 may access various computing applications, including a browser, or other web-based application.

A web-enabled client computer may include a browser application that is configured to send requests and receive responses over the web. The browser application may be configured to receive and display graphics, text, multimedia, and the like, employing virtually any web-based language. In one embodiment, the browser application is enabled to employ JavaScript, HyperText Markup Language (HTML), eXtensible Markup Language (XML), JavaScript Object Notation (JSON), Cascading Style Sheets (CSS), or the like, or combination thereof, to display and send a message. In one embodiment, a user of the client computer may employ the browser application to perform various activities over a network (online). However, another application may also be used to perform various online activities.

Client computers 102-105 also may include at least one other client application that is configured to receive or send content between another computer. The client application may include a capability to send or receive content, or the like. The client application may further provide information that identifies itself, including a type, capability, name, and the like. In one embodiment, client computers 102-105 may uniquely identify themselves through any of a variety of mechanisms, including an Internet Protocol (IP) address, a phone number, Mobile Identification Number (MIN), an electronic serial number (ESN), a client certificate, or other device identifier. Such information may be provided in one or more network packets, or the like, sent between other client computers, ingestion platform server computer 116, profile correlation server computer 118, or other computers.

Client computers 102-105 may further be configured to include a client application that enables an end-user to log into an end-user account that may be managed by another computer, such as ingestion platform server computer 116, profile correlation server computer 118, or the like. Such an end-user account, in one non-limiting example, may be configured to enable the end-user to manage one or more online activities, including in one non-limiting example, project management, software development, system administration, configuration management, search activities, social networking activities, browse various websites, communicate with other users, or the like. Also, client computers may be arranged to enable users to display reports, interactive user-interfaces, or results provided by portfolio platform server computer 116, or the like.

Wireless network 108 is configured to couple client computers 103-105 and its components with network 110. Wireless network 108 may include any of a variety of wireless sub-networks that may further overlay stand-alone ad-hoc networks, and the like, to provide an infrastructure-oriented connection for client computers 103-105. Such sub-networks may include mesh networks, Wireless LAN (WLAN) networks, cellular networks, and the like. In one embodiment, the system may include more than one wireless network.

Wireless network 108 may further include an autonomous system of terminals, gateways, routers, and the like connected by wireless radio links, and the like. These connectors may be configured to move freely and randomly and organize themselves arbitrarily, such that the topology of wireless network 108 may change rapidly.

Wireless network 108 may further employ a plurality of access technologies including 2nd (2G), 3rd (3G), 4th (4G) 5th (5G) generation radio access for cellular systems, WLAN, Wireless Router (WR) mesh, and the like. Access technologies such as 2G, 3G, 4G, 5G, and future access networks may enable wide area coverage for mobile computers, such as client computers 103-105 with various degrees of mobility. In one non-limiting example, wireless network 108 may enable a radio connection through a radio network access such as Global System for Mobil communication (GSM), General Packet Radio Services (GPRS), Enhanced Data GSM Environment (EDGE), code division multiple access (CDMA), time division multiple access (TDMA), Wideband Code Division Multiple Access (WCDMA), High Speed Downlink Packet Access (HSDPA), Long Term Evolution (LTE), and the like. In essence, wireless network 108 may include virtually any wireless communication mechanism by which information may travel between client computers 103-105 and another computer, network, a cloud-based network, a cloud instance, or the like.

Network 110 is configured to couple network computers with other computers, including, portfolio platform computer 116, client computers 102, and client computers 103-105 through wireless network 108, or the like. Network 110 is enabled to employ any form of computer readable media for communicating information from one electronic device to another. Also, network 110 can include the Internet in addition to local area networks (LANs), wide area networks (WANs), direct connections, such as through a universal serial bus (USB) port, Ethernet port, other forms of computer-readable media, or any combination thereof. On an interconnected set of LANs, including those based on differing architectures and protocols, a router acts as a link between LANs, enabling messages to be sent from one to another. In addition, communication links within LANs typically include twisted wire pair or coaxial cable, while communication links between networks may utilize analog telephone lines, full or fractional dedicated digital lines including T1, T2, T3, and T4, or other carrier mechanisms including, for example, E-carriers, Integrated Services Digital Networks (ISDNs), Digital Subscriber Lines (DSLs), wireless links including satellite links, or other communications links known to those skilled in the art. Moreover, communication links may further employ any of a variety of digital signaling technologies, including without limit, for example, DS-0, DS-1, DS-2, DS-3, DS-4, OC-3, OC-12, OC-48, or the like. Furthermore, remote computers and other related electronic devices could be remotely connected to either LANs or WANs via a modem and temporary telephone link. In one embodiment, network 110 may be configured to transport information of an Internet Protocol (IP).

Additionally, communication media typically embodies computer readable instructions, data structures, program modules, or other transport mechanism and includes any information non-transitory delivery media or transitory delivery media. By way of example, communication media includes wired media such as twisted pair, coaxial cable, fiber optics, wave guides, and other wired media and wireless media such as acoustic, RF, infrared, and other wireless media.

Also, one embodiment of portfolio platform server computer 116 is described in more detail below in conjunction with FIG. 3. Although FIG. 1 illustrates portfolio platform server computer 116, or the like, as a single computer, the innovations or embodiments are not so limited. For example, one or more functions of portfolio platform server computer 116, or the like, may be distributed across one or more distinct network computers. Moreover, in one or more embodiments, portfolio platform server computer 116 may be implemented using a plurality of network computers. Further, in one or more of the various embodiments, portfolio platform server computer 116, or the like, may be implemented using one or more cloud instances in one or more cloud networks. Accordingly, these innovations and embodiments are not to be construed as being limited to a single environment, and other configurations, and other architectures are also envisaged.

Illustrative Client Computer

Figure 2:
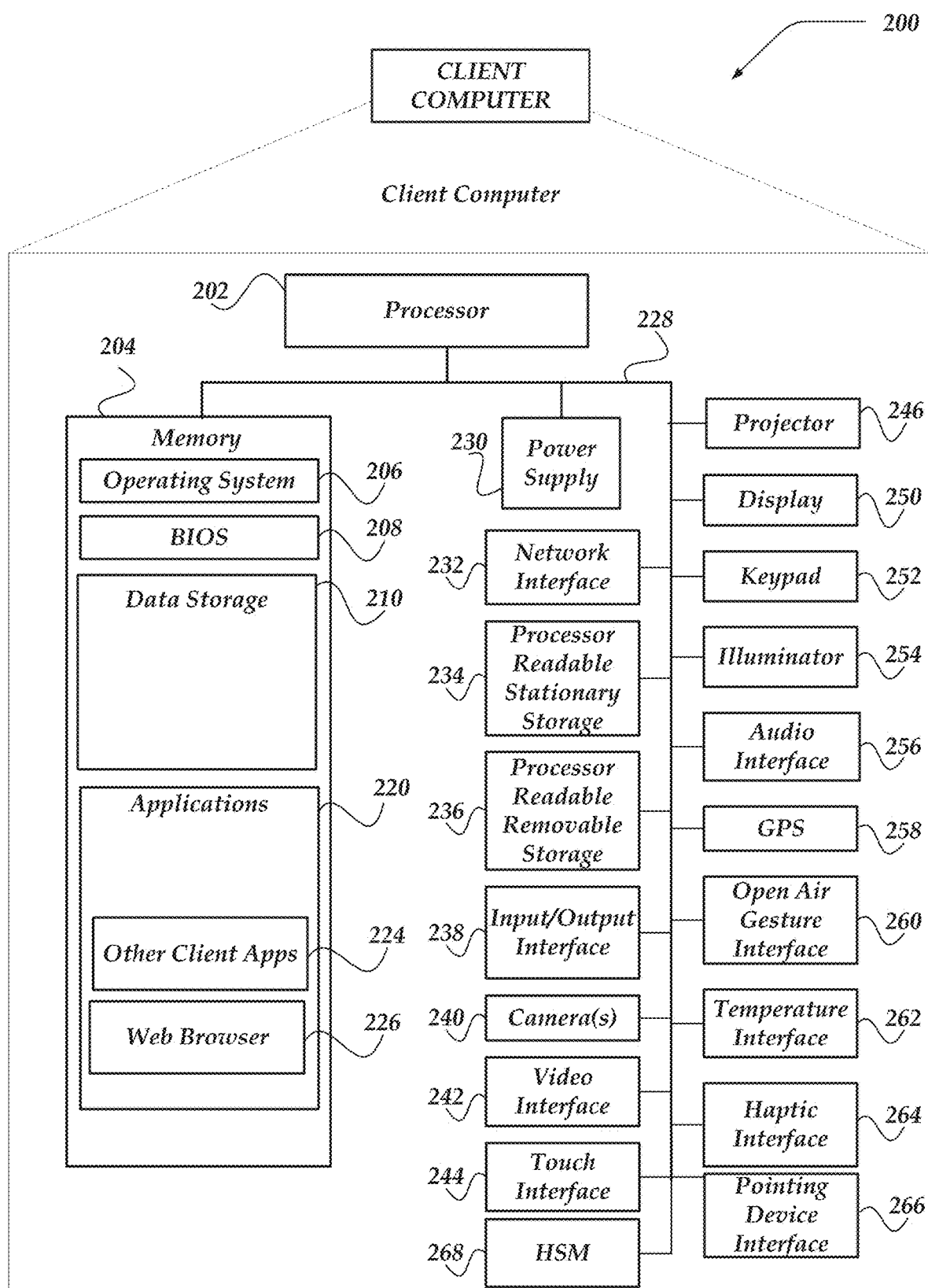
FIG. 2 illustrates a schematic embodiment of a client computer.

FIG. 2 shows one embodiment of client computer 200 that may include many more or less components than those shown. Client computer 200 may represent, for example, one or more embodiments of mobile computers or client computers shown in FIG. 1.

Client computer 200 may include processor 202 in communication with memory 204 via bus 228. Client computer 200 may also include power supply 230, network interface 232, audio interface 256, display 250, keypad 252, illuminator 254, video interface 242, input/output interface 238, haptic interface 264, global positioning systems (GPS) receiver 258, open air gesture interface 260, temperature interface 262, camera(s) 240, projector 246, pointing device interface 266, processor-readable stationary storage device 234, and processor-readable removable storage device 236. Client computer 200 may optionally communicate with a base station (not shown), or directly with another computer. And in one embodiment, although not shown, a gyroscope may be employed within client computer 200 to measuring or maintaining an orientation of client computer 200.

Power supply 230 may provide power to client computer 200. A rechargeable or non-rechargeable battery may be used to provide power. The power may also be provided by an external power source, such as an AC adapter or a powered docking cradle that supplements or recharges the battery.

Network interface 232 includes circuitry for coupling client computer 200 to one or more networks, and is constructed for use with one or more communication protocols and technologies including, but not limited to, protocols and technologies that implement any portion of the OSI model for mobile communication (GSM), CDMA, time division multiple access (TDMA), UDP, TCP/IP, SMS, MMS, GPRS, WAP, UWB, WiMax, SIP/RTP, GPRS, EDGE, WCDMA, LTE, UMTS, OFDM, CDMA2000, EV-DO, HSDPA, or any of a variety of other wireless communication protocols. Network interface 232 is sometimes known as a transceiver, transceiving device, or network interface card (MC).

Audio interface 256 may be arranged to produce and receive audio signals such as the sound of a human voice. For example, audio interface 256 may be coupled to a speaker and microphone (not shown) to enable telecommunication with others or generate an audio acknowledgment for some action. A microphone in audio interface 256 can also be used for input to or control of client computer 200, e.g., using voice recognition, detecting touch based on sound, and the like.

Display 250 may be a liquid crystal display (LCD), gas plasma, electronic ink, light emitting diode (LED), Organic LED (OLED) or any other type of light reflective or light transmissive display that can be used with a computer. Display 250 may also include a touch interface 244 arranged to receive input from an object such as a stylus or a digit from a human hand, and may use resistive, capacitive, surface acoustic wave (SAW), infrared, radar, or other technologies to sense touch or gestures.

Projector 246 may be a remote handheld projector or an integrated projector that is capable of projecting an image on a remote wall or any other reflective object such as a remote screen.

Video interface 242 may be arranged to capture video images, such as a still photo, a video segment, an infrared video, or the like. For example, video interface 242 may be coupled to a digital video camera, a web-camera, or the like. Video interface 242 may comprise a lens, an image sensor, and other electronics. Image sensors may include a complementary metal-oxide-semiconductor (CMOS) integrated circuit, charge-coupled device (CCD), or any other integrated circuit for sensing light.

Keypad 252 may comprise any input device arranged to receive input from a user. For example, keypad 252 may include a push button numeric dial, or a keyboard. Keypad 252 may also include command buttons that are associated with selecting and sending images.

Illuminator 254 may provide a status indication or provide light. Illuminator 254 may remain active for specific periods of time or in response to event messages. For example, when illuminator 254 is active, it may back-light the buttons on keypad 252 and stay on while the client computer is powered. Also, illuminator 254 may back-light these buttons in various patterns when particular actions are performed, such as dialing another client computer. Illuminator 254 may also cause light sources positioned within a transparent or translucent case of the client computer to illuminate in response to actions.

Further, client computer 200 may also comprise hardware security module (HSM) 268 for providing additional tamper resistant safeguards for generating, storing or using security/cryptographic information such as, keys, digital certificates, passwords, passphrases, two-factor authentication information, or the like. In some embodiments, hardware security module may be employed to support one or more standard public key infrastructures (PKI), and may be employed to generate, manage, or store keys pairs, or the like. In some embodiments, HSM 268 may be a stand-alone computer, in other cases, HSM 268 may be arranged as a hardware card that may be added to a client computer.

Client computer 200 may also comprise input/output interface 238 for communicating with external peripheral devices or other computers such as other client computers and network computers. The peripheral devices may include an audio headset, virtual reality headsets, display screen glasses, remote speaker system, remote speaker and microphone system, and the like. Input/output interface 238 can utilize one or more technologies, such as Universal Serial Bus (USB), Infrared, WiFi, WiMax, Bluetooth™, and the like.

Input/output interface 238 may also include one or more sensors for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), or the like. Sensors may be one or more hardware sensors that collect or measure data that is external to client computer 200.

Haptic interface 264 may be arranged to provide tactile feedback to a user of the client computer. For example, the haptic interface 264 may be employed to vibrate client computer 200 in a particular way when another user of a computer is calling. Temperature interface 262 may be used to provide a temperature measurement input or a temperature changing output to a user of client computer 200. Open air gesture interface 260 may sense physical gestures of a user of client computer 200, for example, by using single or stereo video cameras, radar, a gyroscopic sensor inside a computer held or worn by the user, or the like. Camera 240 may be used to track physical eye movements of a user of client computer 200.

GPS transceiver 258 can determine the physical coordinates of client computer 200 on the surface of the Earth, which typically outputs a location as latitude and longitude values. GPS transceiver 258 can also employ other geo-positioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of client computer 200 on the surface of the Earth. It is understood that under different conditions, GPS transceiver 258 can determine a physical location for client computer 200. In one or more embodiments, however, client computer 200 may, through other components, provide other information that may be employed to determine a physical location of the client computer, including for example, a Media Access Control (MAC) address, IP address, and the like.

In at least one of the various embodiments, applications, such as, operating system 206, other client apps 224, web browser 226, or the like, may be arranged to employ geo-location information to select one or more localization features, such as, time zones, languages, currencies, calendar formatting, or the like. Localization features may be used in user-interfaces, reports, as well as internal processes or databases. In at least one of the various embodiments, geo-location information used for selecting localization information may be provided by GPS 258. Also, in some embodiments, geolocation information may include information provided using one or more geolocation protocols over the networks, such as, wireless network 108 or network 111.

Human interface components can be peripheral devices that are physically separate from client computer 200, allowing for remote input or output to client computer 200. For example, information routed as described here through human interface components such as display 250 or keyboard 252 can instead be routed through network interface 232 to appropriate human interface components located remotely. Examples of human interface peripheral components that may be remote include, but are not limited to, audio devices, pointing devices, keypads, displays, cameras, projectors, and the like. These peripheral components may communicate over networks implemented using WiFi, Bluetooth™, Bluetooth LTE™, and the like. One non-limiting example of a client computer with such peripheral human interface components is a wearable computer, which might include a remote pico projector along with one or more cameras that remotely communicate with a separately located client computer to sense a user's gestures toward portions of an image projected by the pico projector onto a reflected surface such as a wall or the user's hand.

A client computer may include web browser application 226 that is configured to receive and to send web pages, web-based messages, graphics, text, multimedia, and the like. The client computer's browser application may employ virtually any programming language, including a wireless application protocol messages (WAP), and the like. In one or more embodiments, the browser application is enabled to employ Handheld Device Markup Language (HDML), Wireless Markup Language (WML), WMLScript, JavaScript, Standard Generalized Markup Language (SGML), HyperText Markup Language (HTML), eXtensible Markup Language (XML), HTML5, and the like.

Memory 204 may include RAM, ROM, or other types of memory. Memory 204 illustrates an example of computer-readable storage media (devices) for storage of information such as computer-readable instructions, data structures, program modules or other data. Memory 204 may store BIOS 208 for controlling low-level operation of client computer 200. The memory may also store operating system 206 for controlling the operation of client computer 200. It will be appreciated that this component may include a general-purpose operating system such as a version of UNIX, or Linux®, or a specialized client computer operating system such as iOS, or the like. The operating system may include, or interface with a Java virtual machine module that enables control of hardware components or operating system operations via Java application programs.

Memory 204 may further include one or more data storage 210, which can be utilized by client computer 200 to store, among other things, applications 220 or other data. For example, data storage 210 may also be employed to store information that describes various capabilities of client computer 200. The information may then be provided to another device or computer based on any of a variety of methods, including being sent as part of a header during a communication, sent upon request, or the like. Data storage 210 may also be employed to store social networking information including address books, buddy lists, aliases, user profile information, or the like. Data storage 210 may further include program code, data, algorithms, and the like, for use by a processor, such as processor 202 to execute and perform actions. In one embodiment, at least some of data storage 210 might also be stored on another component of client computer 200, including, but not limited to, non-transitory processor-readable removable storage device 236, processor-readable stationary storage device 234, or even external to the client computer.

Applications 220 may include computer executable instructions which, when executed by client computer 200, transmit, receive, or otherwise process instructions and data. Applications 220 may include, for example, other client applications 224, web browser 226, or the like. Client computers may be arranged to exchange communications one or more servers or other computers.

Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, visualization applications, and so forth.

Additionally, in one or more embodiments (not shown in the figures), client computer 200 may include an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. Also, in one or more embodiments (not shown in the figures), client computer 200 may include one or more hardware micro-controllers instead of CPUs. In one or more embodiments, the one or more micro-controllers may directly execute their own embedded logic to perform actions and access its own internal memory and its own external Input and Output Interfaces (e.g., hardware pins or wireless transceivers) to perform actions, such as System On a Chip (SOC), or the like.

Illustrative Network Computer

Figure 3:
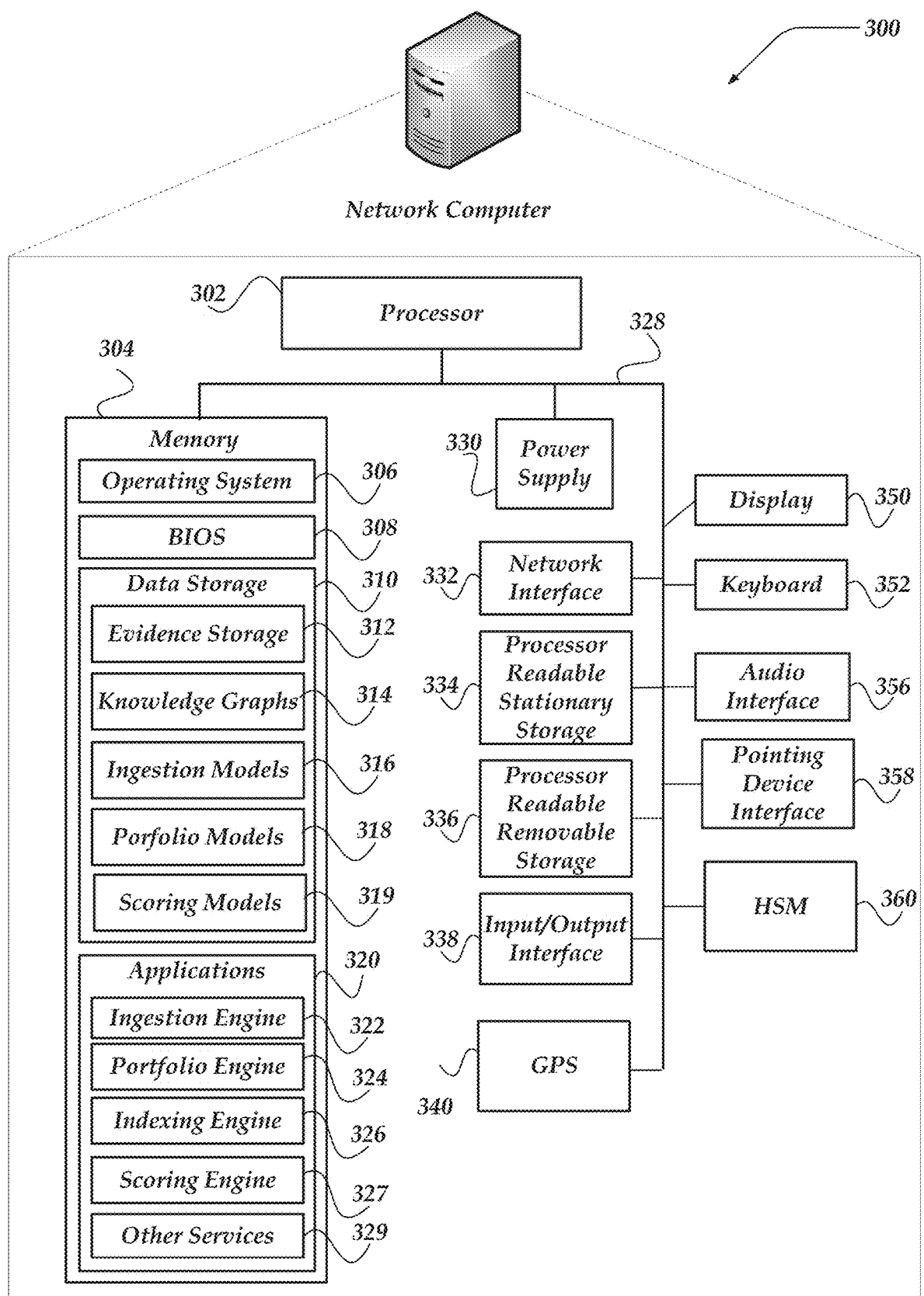
FIG. 3 illustrates a schematic embodiment of a network computer.

FIG. 3 shows one embodiment of network computer 300 that may be included in a system implementing one or more of the various embodiments. Network computer 300 may include many more or less components than those shown in FIG. 3. However, the components shown are sufficient to disclose an illustrative embodiment for practicing these innovations. Network computer 300 may represent, for example, one or more embodiments of portfolio platform server computer 116, or the like, of FIG. 1.

Network computers, such as, network computer 300 may include a processor 302 that may be in communication with a memory 304 via a bus 328. In some embodiments, processor 302 may be comprised of one or more hardware processors, or one or more processor cores. In some cases, one or more of the one or more processors may be specialized processors designed to perform one or more specialized actions, such as, those described herein. Network computer 300 also includes a power supply 330, network interface 332, audio interface 356, display 350, keyboard 352, input/output interface 338, processor-readable stationary storage device 334, and processor-readable removable storage device 336. Power supply 330 provides power to network computer 300.

Network interface 332 includes circuitry for coupling network computer 300 to one or more networks, and is constructed for use with one or more communication protocols and technologies including, but not limited to, protocols and technologies that implement any portion of the Open Systems Interconnection model (OSI model), global system for mobile communication (GSM), code division multiple access (CDMA), time division multiple access (TDMA), user datagram protocol (UDP), transmission control protocol/Internet protocol (TCP/IP), Short Message Service (SMS), Multimedia Messaging Service (MMS), general packet radio service (GPRS), WAP, ultra-wide band (UWB), IEEE 802.16 Worldwide Interoperability for Microwave Access (WiMax), Session Initiation Protocol/Real-time Transport Protocol (SIP/RTP), or any of a variety of other wired and wireless communication protocols. Network interface 332 is sometimes known as a transceiver, transceiving device, or network interface card (NIC). Network computer 300 may optionally communicate with a base station (not shown), or directly with another computer.

Audio interface 356 is arranged to produce and receive audio signals such as the sound of a human voice. For example, audio interface 356 may be coupled to a speaker and microphone (not shown) to enable telecommunication with others or generate an audio acknowledgment for some action. A microphone in audio interface 356 can also be used for input to or control of network computer 300, for example, using voice recognition.

Display 350 may be a liquid crystal display (LCD), gas plasma, electronic ink, light emitting diode (LED), Organic LED (OLED) or any other type of light reflective or light transmissive display that can be used with a computer. In some embodiments, display 350 may be a handheld projector or pico projector capable of projecting an image on a wall or other object.

Network computer 300 may also comprise input/output interface 338 for communicating with external devices or computers not shown in FIG. 3. Input/output interface 338 can utilize one or more wired or wireless communication technologies, such as USB™, Firewire™, WiFi, WiMax, Thunderbolt™, Infrared, Bluetooth™, Zigbee™, serial port, parallel port, and the like.

Also, input/output interface 338 may also include one or more sensors for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), or the like. Sensors may be one or more hardware sensors that collect or measure data that is external to network computer 300. Human interface components can be physically separate from network computer 300, allowing for remote input or output to network computer 300. For example, information routed as described here through human interface components such as display 350 or keyboard 352 can instead be routed through the network interface 332 to appropriate human interface components located elsewhere on the network. Human interface components include any component that allows the computer to take input from, or send output to, a human user of a computer. Accordingly, pointing devices such as mice, styluses, track balls, or the like, may communicate through pointing device interface 358 to receive user input.

GPS transceiver 340 can determine the physical coordinates of network computer 300 on the surface of the Earth, which typically outputs a location as latitude and longitude values. GPS transceiver 340 can also employ other geo-positioning mechanisms, including, but not limited to, tri-angulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of network computer 300 on the surface of the Earth. It is understood that under different conditions, GPS transceiver 340 can determine a physical location for network computer 300. In one or more embodiments, however, network computer 300 may, through other components, provide other information that may be employed to determine a physical location of the client computer, including for example, a Media Access Control (MAC) address, IP address, and the like.

In at least one of the various embodiments, applications, such as, operating system 306, ingestion engine 322, portfolio engine 324, indexing engine 326, scoring engine 327, other services 329, or the like, may be arranged to employ geo-location information to select one or more localization features, such as, time zones, languages, currencies, currency formatting, calendar formatting, or the like. Localization features may be used in user interfaces, dashboards, reports, as well as internal processes or databases. In at least one of the various embodiments, geo-location information used for selecting localization information may be provided by GPS 340. Also, in some embodiments, geolocation information may include information provided using one or more geolocation protocols over the networks, such as, wireless network 108 or network 111.

Memory 304 may include Random Access Memory (RAM), Read-Only Memory (ROM), or other types of memory. Memory 304 illustrates an example of computer-readable storage media (devices) for storage of information such as computer-readable instructions, data structures, program modules or other data. Memory 304 stores a basic input/output system (BIOS) 308 for controlling low-level operation of network computer 300. The memory also stores an operating system 306 for controlling the operation of network computer 300. It will be appreciated that this component may include a general-purpose operating system such as a version of UNIX, or Linux®, or a specialized operating system such as Microsoft Corporation's Windows operating system, or the Apple Corporation's macOS® operating system. The operating system may include, or interface with one or more virtual machine modules, such as, a Java virtual machine module that enables control of hardware components or operating system operations via Java application programs. Likewise, other runtime environments may be included.

Memory 304 may further include one or more data storage 310, which can be utilized by network computer 300 to store, among other things, applications 320 or other data. For example, data storage 310 may also be employed to store information that describes various capabilities of network computer 300. The information may then be provided to another device or computer based on any of a variety of methods, including being sent as part of a header during a communication, sent upon request, or the like. Data storage 310 may also be employed to store social networking information including address books, friend lists, aliases, user profile information, or the like. Data storage 310 may further include program code, data, algorithms, and the like, for use by a processor, such as processor 302 to execute and perform actions such as those actions described below. In one embodiment, at least some of data storage 310 might also be stored on another component of network computer 300, including, but not limited to, non-transitory media inside processor-readable removable storage device 336, processor-readable stationary storage device 334, or any other computer-readable storage device within network computer 300, or even external to network computer 300. Data storage 310 may include, for example, evidence data stores 312, knowledge graphs 314, ingestion models 316, portfolio models 318, scoring models 319, or the like.

Applications 320 may include computer executable instructions which, when executed by network computer 300, transmit, receive, or otherwise process messages (e.g., SMS, Multimedia Messaging Service (MMS), Instant Message (IM), email, or other messages), audio, video, and enable telecommunication with another user of another mobile computer. Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth. Applications 320 may include ingestion engine 322, portfolio engine 326, indexing engine 326, scoring engine 327, other services 329, or the like, that may be arranged to perform actions for embodiments described below. In one or more of the various embodiments, one or more of the applications may be implemented as modules or components of another application. Further, in one or more of the various embodiments, applications may be implemented as operating system extensions, modules, plugins, or the like.

Furthermore, in one or more of the various embodiments, ingestion engine 322, portfolio engine 324, indexing engine 326, scoring engine 327, other services 329, or the like, may be operative in a cloud-based computing environment. In one or more of the various embodiments, these applications, and others, that comprise the portfolio platform may be executing within virtual machines or virtual servers that may be managed in a cloud-based based computing environment. In one or more of the various embodiments, in this context the applications may flow from one physical network computer within the cloud-based environment to another depending on performance and scaling considerations automatically managed by the cloud computing environment. Likewise, in one or more of the various embodiments, virtual machines or virtual servers dedicated to ingestion engine 322, portfolio engine 324, indexing engine 326, scoring engine 327, other services 329, or the like, may be provisioned and de-commissioned automatically.

Also, in one or more of the various embodiments, ingestion engine 322, portfolio engine 326, indexing engine 326, scoring engine 327, other services 329, or the like, may be located in virtual servers running in a cloud-based computing environment rather than being tied to one or more specific physical network computers.

Further, network computer 300 may also comprise hardware security module (HSM) 360 for providing additional tamper resistant safeguards for generating, storing or using security/cryptographic information such as, keys, digital certificates, passwords, passphrases, two-factor authentication information, or the like. In some embodiments, hardware security module may be employed to support one or more standard public key infrastructures (PKI), and may be employed to generate, manage, or store keys pairs, or the like. In some embodiments, HSM 360 may be a stand-alone network computer, in other cases, HSM 360 may be arranged as a hardware card that may be installed in a network computer.

Additionally, in one or more embodiments (not shown in the figures), network computer 300 may include an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. Also, in one or more embodiments (not shown in the figures), the network computer may include one or more hardware microcontrollers instead of a CPU. In one or more embodiments, the one or more microcontrollers may directly execute their own embedded logic to perform actions and access their own internal memory and their own external Input and Output Interfaces (e.g., hardware pins or wireless transceivers) to perform actions, such as System On a Chip (SOC), or the like.

Illustrative Logical System Architecture for Data Ingestion

Figure 4:
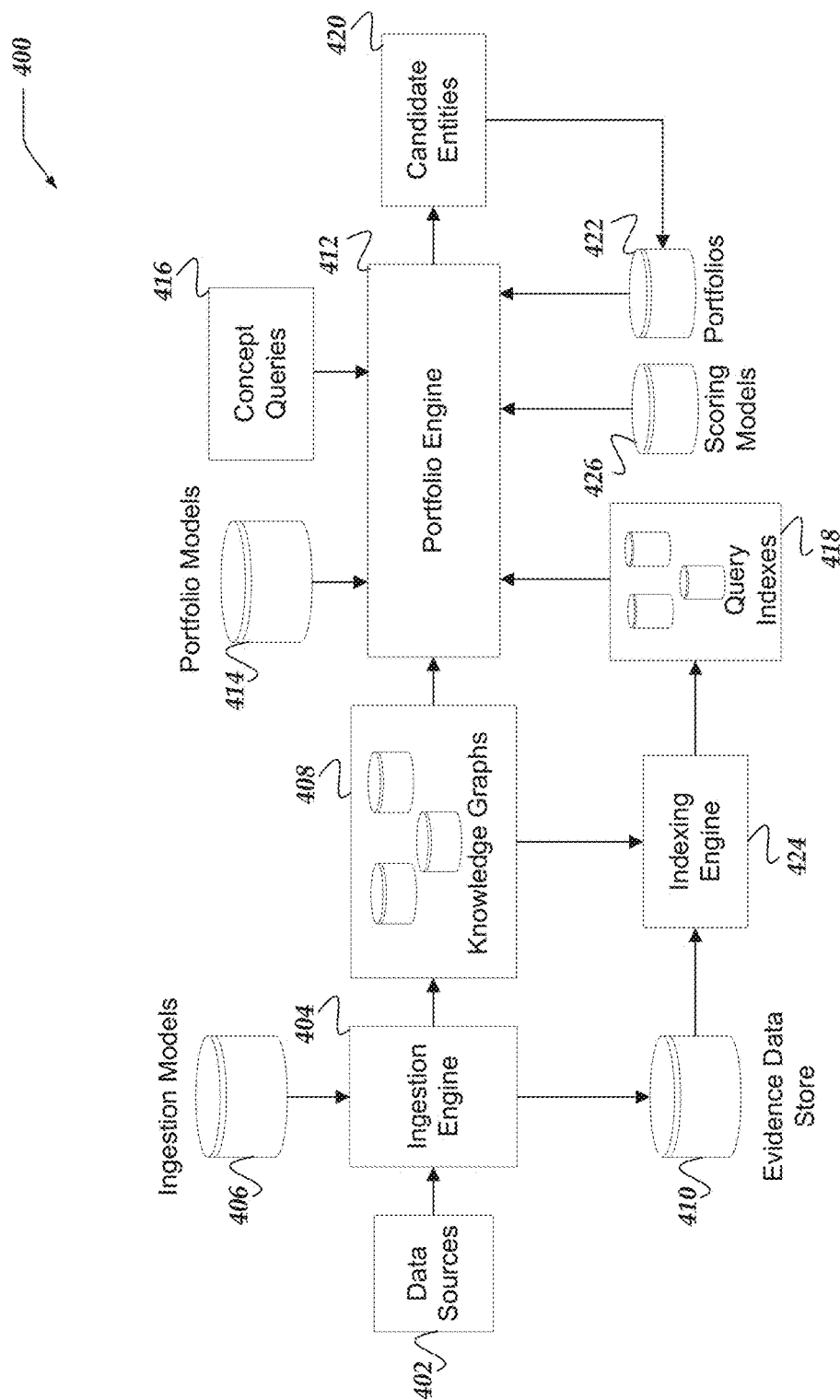
FIG. 4 illustrates a logical architecture of a portion of a portfolio platform for associating thematic concepts and organizations in accordance with one or more of the various embodiments.

FIG. 4 illustrates a logical architecture of a portion of portfolio platform 400 for associating thematic concepts and organizations; and modeling conformance to thematic concepts in accordance with one or more of the various embodiments. In one or more of the various embodiments, portfolio platforms, such as, portfolio platform 400 may include one or more sub-systems, including: one or more data sources, such as, data source 402; one or more ingestion engines, such as, ingestion engine 404; one or more ingestion models stored in one or more ingestion model data stores, such as, ingestion model data store 406; one or more knowledge graphs, such as, knowledge graphs 410; one or more portfolio, such as portfolio engine 412; one or more portfolio models stored in one or more portfolio model data stores, such as, portfolio model data store 414; one or more user interfaces or APIs that enable users to provide concept query information, such as, concept queries 416; one or more query indexes, such as, query indexes 418; one or more portfolio data stores, such as, portfolio data store 422; one or more indexing engines, such as, indexing engine 424; one or more scoring models, such as scoring models 426; or the like.

In one or more of the various embodiments, portfolio platforms may be arranged to receive or obtain raw data from data source 402. In some embodiments, raw data may be information provided from one or more private or public sources. In some embodiments, data sources may include news articles, press releases, social media information, government filings/records, court filings, litigation summaries, curated data sets, conference reports, or the like. In some embodiments, raw information may generally be text based. However, in some embodiments, one or more actions for extracting, transforming, or loading (ETL processing) may be performed by other services to clean up or format the raw information into text that may be suitable for additional automated analysis. For example, in some embodiments, audio files may be transcribed (automatically or otherwise) to text before providing to a portfolio platform. Also, in some embodiments, portfolio platforms may be arranged to include one or more additional (not shown) sub-systems that perform ETL actions.

In one or more of the various embodiments, data sources may include real-time streams of information, such as, news feeds, or the like, as well as periodic bulk transfers of information, such as, annual reports, monthly periodicals, or the like.

In one or more of the various embodiments, ingestion engines, such as, ingestion engine 404 may be arranged to process information from data sources, such as, data source 402. In some embodiments, ingestion engines may be arranged to employ one or more ingestion models, such as, ingestion model 406, to perform various analysis, categorization, or classification on the incoming information.

In one or more of the various embodiments, ingestion models may be one or more data structures that encapsulate the data, rules, machine learning models, machine learning classifiers, natural language processing instructions, or instructions that may be employed to match or map information provided by data sources to one or more knowledge graphs. Ingestion models may include various components, such as, one or more machine learning based classifiers, heuristics, rules, pattern matching, conditions, or the like, that may be employed to match or map information to one or more knowledge graphs. Different ingestion models may be provided for different categories of information. For example, one ingestion model may be directed to ingesting information included in press releases while another ingestion model may be directed to ingesting information included in formal public disclosures, such as, earning calls, merger notices, or the like.

In one or more of the various embodiments, ingestion engines may be arranged to generate or updates one or more knowledge graphs, such as, knowledge graphs 408, based on the applications of the one or more ingestion models. In one or more of the various embodiments, knowledge graphs 408 may represent one or more different knowledge graphs that may be arranged to capture different types of information or relationships, such as, concept graphs, entity graphs, data graphs, or the like.

In one or more of the various embodiments, concept graphs may be one or more data structures or data models that include objects that may represent concepts and their respective relationships. In some embodiments, concept graphs may be based on or represent one or more ontologies. In some embodiments, ontologies or taxonomies represented in concept graphs may be pre-defined, custom, or portions of existing ontologies or taxonomies, or combinations thereof. In some embodiments, ontologies or taxonomies may be created by subject matter experts. In some embodiments, concept graphs may represent the logical organization or relationships of concepts. In some embodiments, each node of a concept graph may be associated with one or more other concepts.

In one or more of the various embodiments, entity graphs may be one or more data structures or data models that include objects that may represent entities or organizations and their respective relationships with other entities or organizations. In some embodiments, each node of an entity graph may be associated with one or more different entities or organizations. Also, in some embodiments, nodes in entity graphs may be associated with various attributes of each represented entity or organization. In some embodiments, each node in an entity graph may be arranged to represent individual instances of entities or organizations rather than classes or types of entities or organizations.

In one or more of the various embodiments, data graphs may be one or more data structures or data models that include objects that may represent a synthesis of information from concept graphs and organization graphs.

In one or more of the various embodiments, ingestion engines may be arranged to store information provided by data sources in one or more evidence data stores, such as, evidence data store 410, or the like. Accordingly, in some embodiments, ingestion engines may be arranged to include a reference or identifier with relevant nodes in concept graphs, entity graphs, or data graphs that enable the original information that was used to generated the node to be viewed by users or other services.

In one or more of the various embodiments, portfolio engines, such as, portfolio engine 412 may be arranged to employ one or more portfolio models, such as, portfolio models 414, to identify one or more entities based on their association with one or more concepts or themes. Accordingly, in some embodiments, portfolio engines may be arranged to receive concept query information and generate result sets include one or more entities that may be associated with the concepts included in the concept query information.

In one or more of the various embodiments, portfolio models may be one or more data structures that encapsulate the data, rules, machine learning models, machine learning classifiers, or instructions that may be employed to determine one or more organizations or entities that may be correlated or otherwise associated with one or more concepts or themes. In one or more of the various embodiments, portfolio models may be arranged to include the criteria (e.g., rules, classifiers, or the like) for determining if entities may be correlated or associated with provided themes or concepts. In some embodiments, portfolio engines may be arranged to evaluate one or more knowledge graphs (e.g., concept graphs, entity graphs, or data graphs) using the one or more portfolio models to determine the entities that may be correlated with the one or more provided concepts.

Also, in one or more of the various embodiments, portfolio engines may be arranged to employ one or more query indexes, such as, query indexes 418 to rapidly execute searches against knowledge graphs or evidence to identity candidate entities based on the provided query concept information.

In one or more of the various embodiments, indexing engines, such as, indexing engine 424 may be arranged to periodically process or analyze evidence in evidence store 410 to update the query indexes. In some embodiments, query indexes 418 may be arranged to include two or more separate/partial indexes. Accordingly, in some embodiments, different indexes may be directed to using different types or keys, bucket sizes, scope, or the like. Also, in some embodiments, two or more indexes may be arranged hierarchical with respect to each other. For example, for some embodiments, a first index may include keys corresponding to broad concepts, while another related second index includes narrower concepts that may be related to broader concepts indexes in the first index.

Accordingly, in one or more of the various embodiments, ingestion engines, such as, ingestion engine 424 may be arranged to generate indexes based on the knowledge graphs and the evidence data stores.

In some embodiments, in response to concept query information, portfolio engines, such as, portfolio engine 412 may be arranged to determine one or more candidate entities, such as, candidate entities 420. In one or more of the various embodiments, candidate entities may be a list of entities that may be ranked, grouped, or sorted based their correlation or associated with concepts derived from the concept query information. In one or more of the various embodiments, the listed entities may be referred to as candidate entities until they are associated with one or more portfolios, such as, portfolios 422.

In one or more of the various embodiments, portfolios may be data structures that list or reference a set of entities selected from the candidate entities. In some embodiments, portfolios may be associated with users, such as, individual users may have one or more portfolios.

In one or more of the various embodiments, as described in more detail below, portfolio engines may be arranged to perform various actions to determine candidate entities that may qualify for inclusion in one or more portfolios. Accordingly, in some embodiments, portfolio platforms may enable users to identify or classify organizations based on their membership in a given portfolio. For example, in some embodiments, organizations that qualify for inclusion in a "green energy" portfolio may be assumed to some level of correlation with concepts related to green energy. However, in some embodiments, absent a deep-dive into the underlying ingestion models, knowledge graphs, portfolio models, and so on, it may be difficult for users to quantify how or why a given organization has qualified for inclusion in a particular portfolio. Thus, in some embodiments, portfolio platforms may be arranged to generate scoring information associated with how well a organization conforms to one or more concepts or themes.

In some embodiments, portfolio platforms may be arranged to employ one or more scoring models, such as, scoring models 426 to generate scoring information for organizations that enable the level of conformance to a concept or themes goals to compared across different organizations. Also, in some embodiments, thematic scores may represent a level of prominence concepts or themes (e.g., multiple related concepts) may have within an organization. For example, in some embodiments, if an organization has a high thematic score for a particular concept, the user may be informed that the organization considers that concept important or at least meets the criteria to be considered supportive or in conformance with the concept.

In one or more of the various embodiments, scoring models may include the rules, instructions, formulas, weights, or the like, to compute thematic scores based on the knowledge graphs. In some embodiments, different concepts or different themes may require one or more different rules, instructions, formulas, weights, or the like, to generate meaningful thematic scores. Accordingly, in some embodiments, scoring models may be provided by configuration information to enable new or different scoring models to be added to portfolio platforms. Likewise, in some embodiments, existing scoring models may be modified manually or automatically based on active or passive user feedback.

Figure 5:
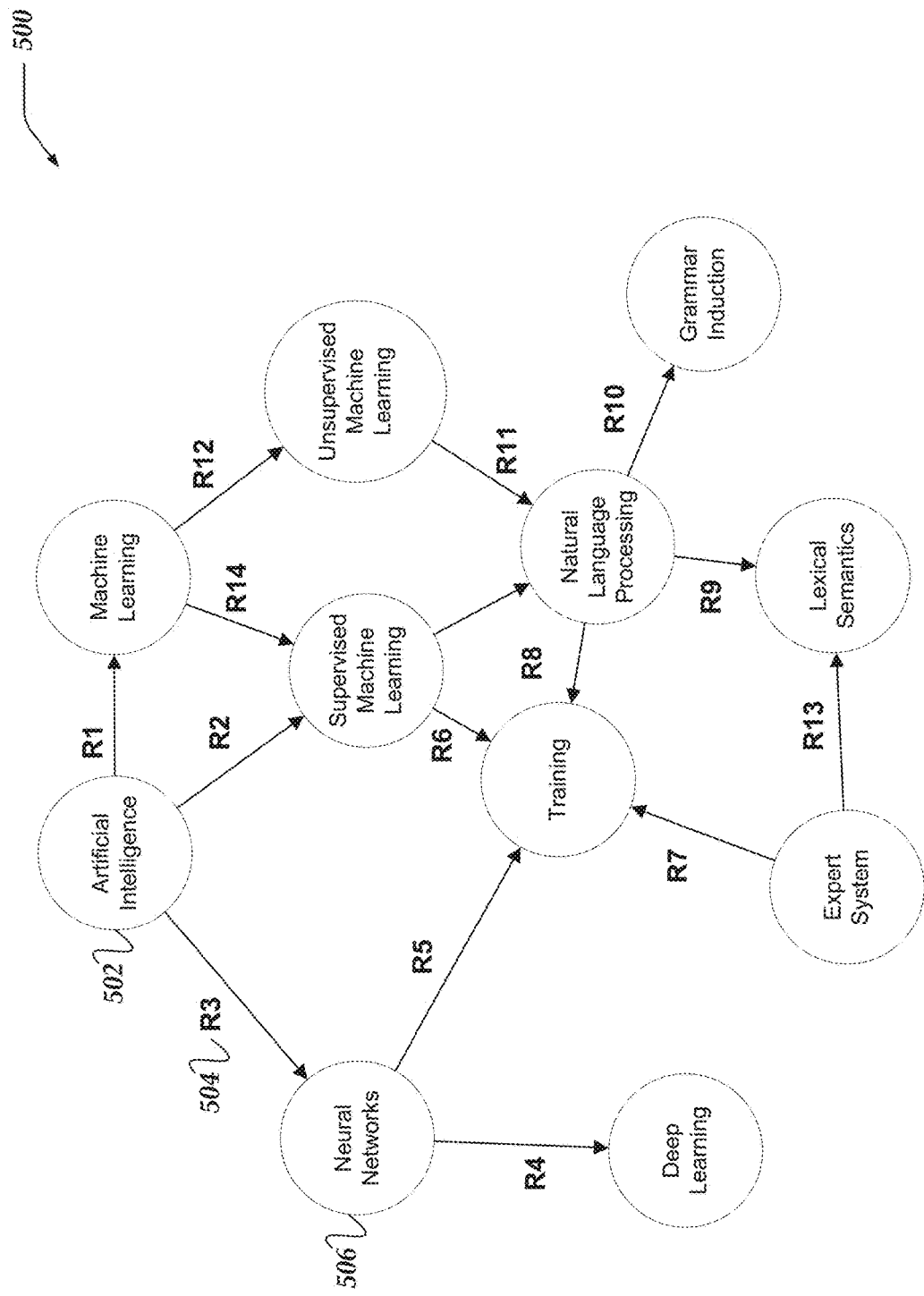
FIG. 5 illustrates a logical schematic of a portion of a concept graph for associating thematic concepts and organizations in accordance with one or more of the various embodiments.

FIG. 5 illustrates a logical schematic of a portion of concept graph 500 for associating thematic concepts and organizations in accordance with one or more of the various embodiments.

In one or more of the various embodiments, concept graphs may include one or more nodes that each correspond to a concept. In some embodiments, edges in concept graphs may represent one or more relationships between the concepts included in the concept graphs.

In one or more of the various embodiments, ingestion engines may be arranged to employ one or more ingestion models to identify the occurrence of concepts from evidence (information) provided by one or more data sources. Likewise, in some embodiments, ingestion engines may be arranged to employ the one or more ingestion models to determine relationships between concepts. In some embodiments, the scope or definition of the relevant relationships may vary depending on problem domain, industry, or the like. Accordingly, in some embodiments, ingestion engines may be arranged to rely on ingestion models to determine the specific criteria for determining if two or more concepts may be related under the terms defined in the ingestion models. For example, for some embodiments, one or more ingestion models may be arranged to define relationships based on one or more taxonomies, ontologies, or the like, that may be determined to be relevant for the type of concepts being processed. In some embodiments, ingestion engines or ingestion models may be arranged to employ natural language processing methods, such as, topic finding, or the like, to identify topics that may be inferred to be topics from the information provided by data sources. Also, in some embodiments, ingestion engines may be arranged to enable one or more users (e.g., domain experts) to define taxonomies, ontologies, or the like, for specific problem domains. Similarly, in some embodiments, ingestion engines may be arranged to enable one or more users to modify or augment one or more taxonomies or ontologies.

Accordingly, in some embodiments, as information from data sources may be processed by ingestion engines, one or more concepts in the information may be extracted based on pre-defined taxonomies or ontologies, expert created custom taxonomies or ontologies, or combination thereof.

In this example, for some embodiments, node 502 may represent a node that corresponds to the concept of "artificial intelligence" and node 506 may represent a node that corresponds to the concept of "neural networks". Accordingly, in this example, relationship 504 may represent the one or more relationships between "artificial intelligence" node 502 and "neural networks" node 506.

In general, for some embodiments, relationships between nodes of a knowledge graphs may represent various relationships between the nodes. The particular relationships may vary depending on the type of knowledge graphs or its purpose.

In some embodiments, as described above, ingestion engines may be arranged to determine relationships between concepts based on taxonomies or ontologies. In one or more of the various embodiments, the relative strength of relationships represented in concept graphs may be based on the frequency that each relationship may be observed in information provided from data sources.

In one or more of the various embodiments, ingestion engines may be arranged to generate partial concept graphs for some or all of the evidence that may be ingested. For example, a news report describing artificial intelligence applications to medicine may result in a partial concept graph similar to concept graph 500. Accordingly, in one or more of the various embodiments, ingestion engines may be arranged to increment a counter value for each relationship in concept graph 500 that may be included in the new partial concept graph made from incoming information. Thus, in some embodiments, relationships that are observed more often than other relationships may have higher count values. In some embodiments, ingestion engines may be arranged to consider concept graph relationships that have higher counts as being stronger than other relationships with lower counts.

In one or more of the various embodiments, concept graphs may include one or more disconnected portions. In some embodiments, disconnected portions of a concept graph represent unrelated concepts.

Note, in this example, and throughout this discussion, knowledge graphs are illustrated as conventional graphs in two dimensions. One of ordinary skill in the art will appreciate that a variety of data structures, such as, tables, structures, lists, hashes, arrays, objects, or the like, may be employed to store or implement the nodes or relationships of knowledge graphs depending on the capabilities of the underlying data stores or other local requirements or local circumstances.

Figure 6:
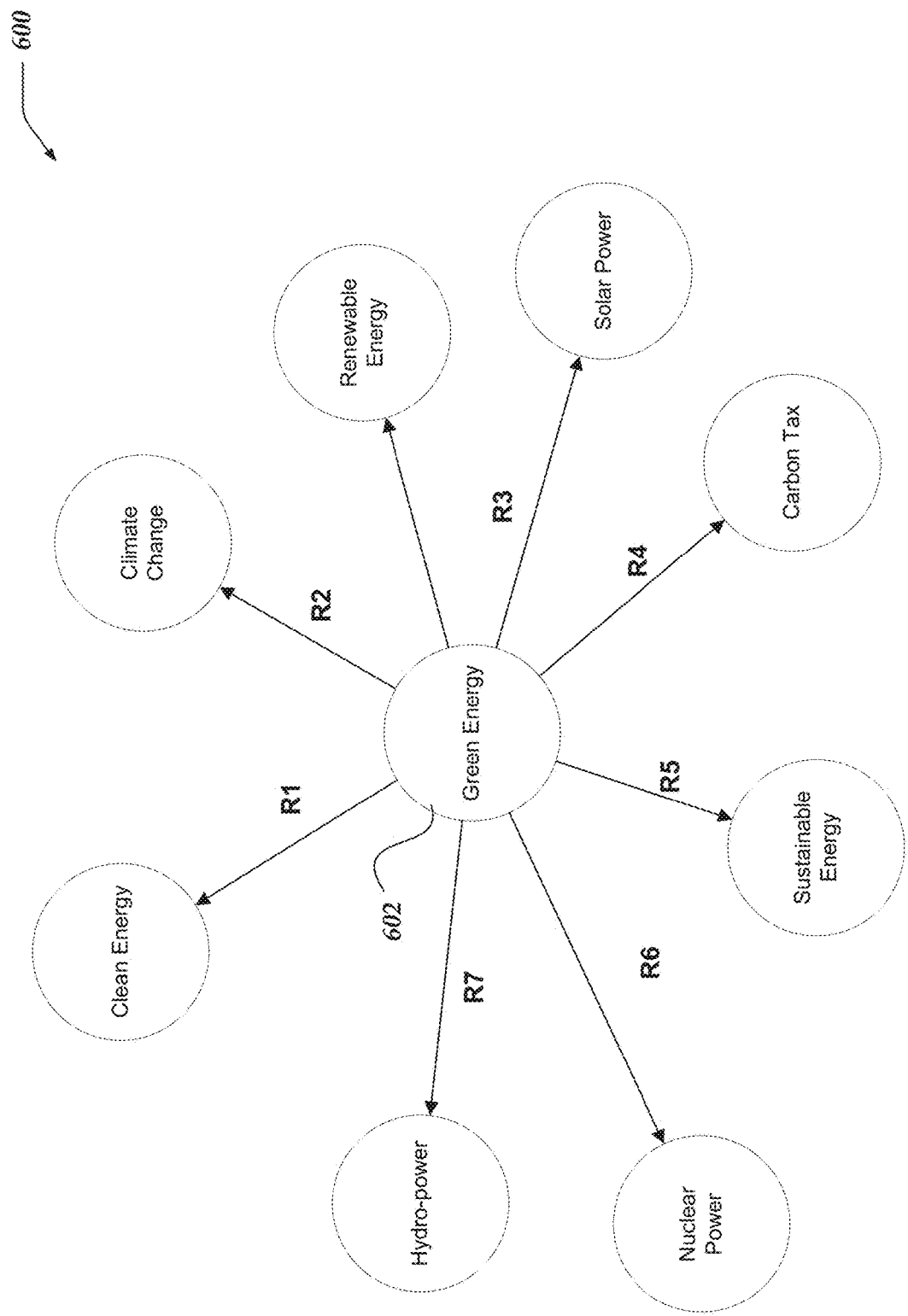
FIG. 6 illustrates a logical schematic of a portion of a concept graph for associating thematic concepts and organizations in accordance with one or more of the various embodiments.

FIG. 6 illustrates a logical schematic of a portion of concept graph 600 for associating thematic concepts and organizations in accordance with one or more of the various embodiments. In this example, concept graph 600 represents a concept graph similar in structure or purpose to concept graph 500. However, in this example, it includes different concepts that are related to green energy rather than artificial intelligence. For brevity and clarity additional description of concept graph 600 is omitted as it may be considered similar in function to concept graph 500 described above.

In one or more of the various embodiments, portfolio engines or scoring engines may be arranged to determine one or more concepts that may be related to an anchor concept. In some embodiments, an anchor concept may be a concept identified in a query or otherwise selected by a user. In some embodiments, portfolio engines or scoring engines may be arranged to determine or provide one or more other concepts that may be related to an anchor concept.

Accordingly, in one or more of the various embodiments, portfolio engines or scoring engines may be arranged to provide one or more related concepts based on traversing a concept graph to determine one or more concepts based on one or more relationships between the one or more concepts and the anchor concept such that each relationship between the anchor concept and the one or more concepts may be associated with a relationship strength values that exceed a threshold value. In some embodiments, themes may be determined based on one or more anchor concepts and the one or more of the concepts determined to be related to the anchor concept. In this example, for some embodiments, concept 602 may be considered an anchor concept.

Figure 7:
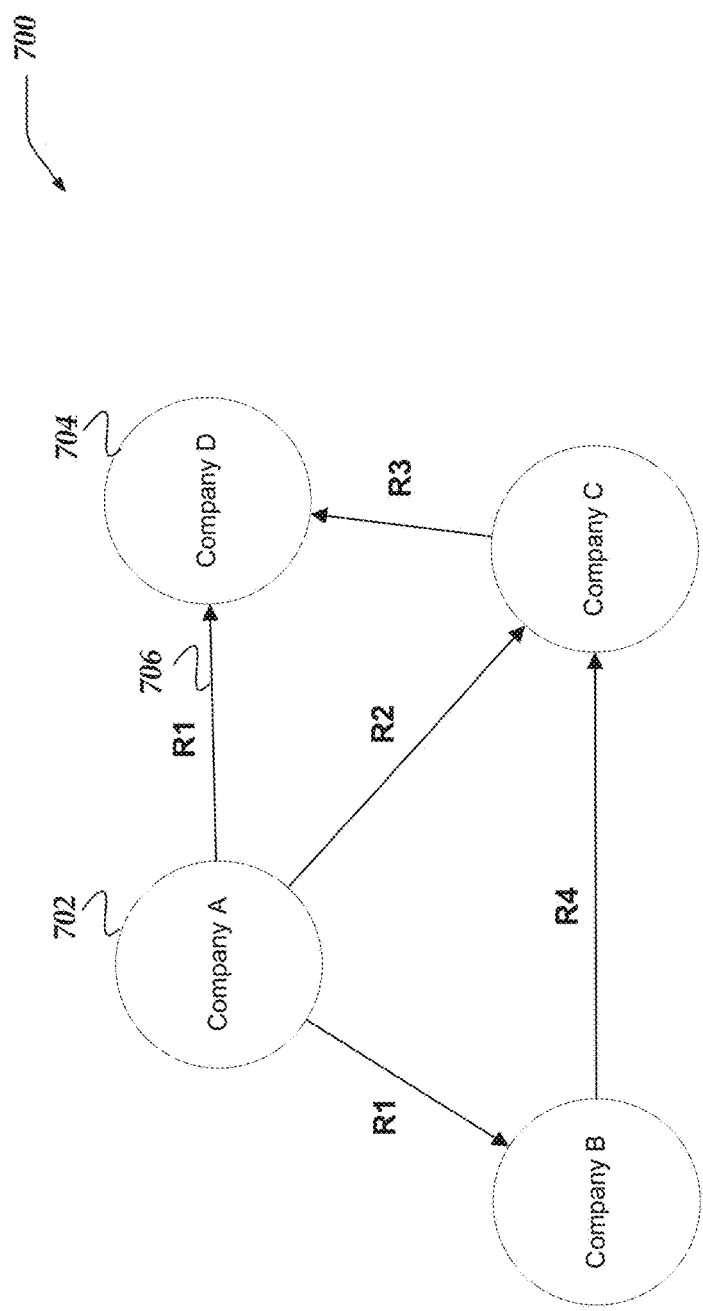
FIG. 7 illustrates a logical schematic of a portion of an entity graph for associating thematic concepts and organizations in accordance with one or more of the various embodiments.

FIG. 7 illustrates a logical schematic of a portion of entity graph 700 for associating thematic concepts and organizations in accordance with one or more of the various embodiments.

In one or more of the various embodiments, entity graphs may include one or more nodes that each correspond to an entity, such as, a company, an organization, or the like. In some embodiments, edges in entity graphs may represent one or more relationships between the entities included in the entity graphs.

In one or more of the various embodiments, ingestion engines may be arranged to employ one or more ingestion models to determine entities from evidence information provided by one or more data sources. Accordingly, in some embodiments, one or more ingestion models may be arranged to determine entities from company names, trademarks, products, or the like, that may be included in evidence information.

In some embodiments, ingestion models may be arranged to employ natural language processing to determine relationships between the observed entities based on various metrics such as word distances, frequency of co-appearance, or the like.

Also, in one or more of the various embodiments, ingestion engines may be arranged to employ one or more ingestion models that are arranged to detect specific features that may be associated with one or more different types of relationships between related entities. Accordingly, in some embodiments, one or more ingestion models may be directed to evaluate one or more features, such as, geographic location, board members, suppliers, customers, litigation activity, markets/problem domains, financial performance, property records, employees, growth plans, employment activity (e.g., head count, announced layoffs, job ads, or the like), litigation activity, or the like. In some embodiments, ingestion engines may be arranged to determine ingestion models from configuration information to account for local requirements or local circumstances.

In some embodiments, ingestion models may include rules or instructions that validate or compare facts discovered from evidence information with one or more external services or databases, such as, corporate registries, trademark registries, property records, or the like.

In this example, for some embodiments, entity node 702 and entity node 704 may be considered to represent entities. In this example, the entities are companies, however, these innovations are not so limited, other entity graphs may represent different types of entities or the same entity graph may include different types of entities.

Also, in this example, for some embodiments, relationship 706 represents one or more relationships between Company A (node 702) and Company D (node 704). In this example, for brevity and clarity each relationship in entity graph 700 may represent a bundle of relationships representing various types of relationships between entities that may be discovered or observed. In some embodiments, different entities in the same entity graph may be related by different types of relationships. Alternatively, in some embodiments, ingestion engines may be arranged to generate different or separate entity graphs for one or more different relationship types. For example, an entity graph that represents relationships based on geography may be separate from another entity graph that represents relationships based on customers.

In one or more of the various embodiments, ingestion engines may be arranged to employ the one or more ingestion models to determine the strength of the different relationships. Also, in one or more of the various embodiments, ingestion engines may be arranged to weight different types of relationships differently based on configuration information to account for local requirements or local circumstances.

Figure 8:
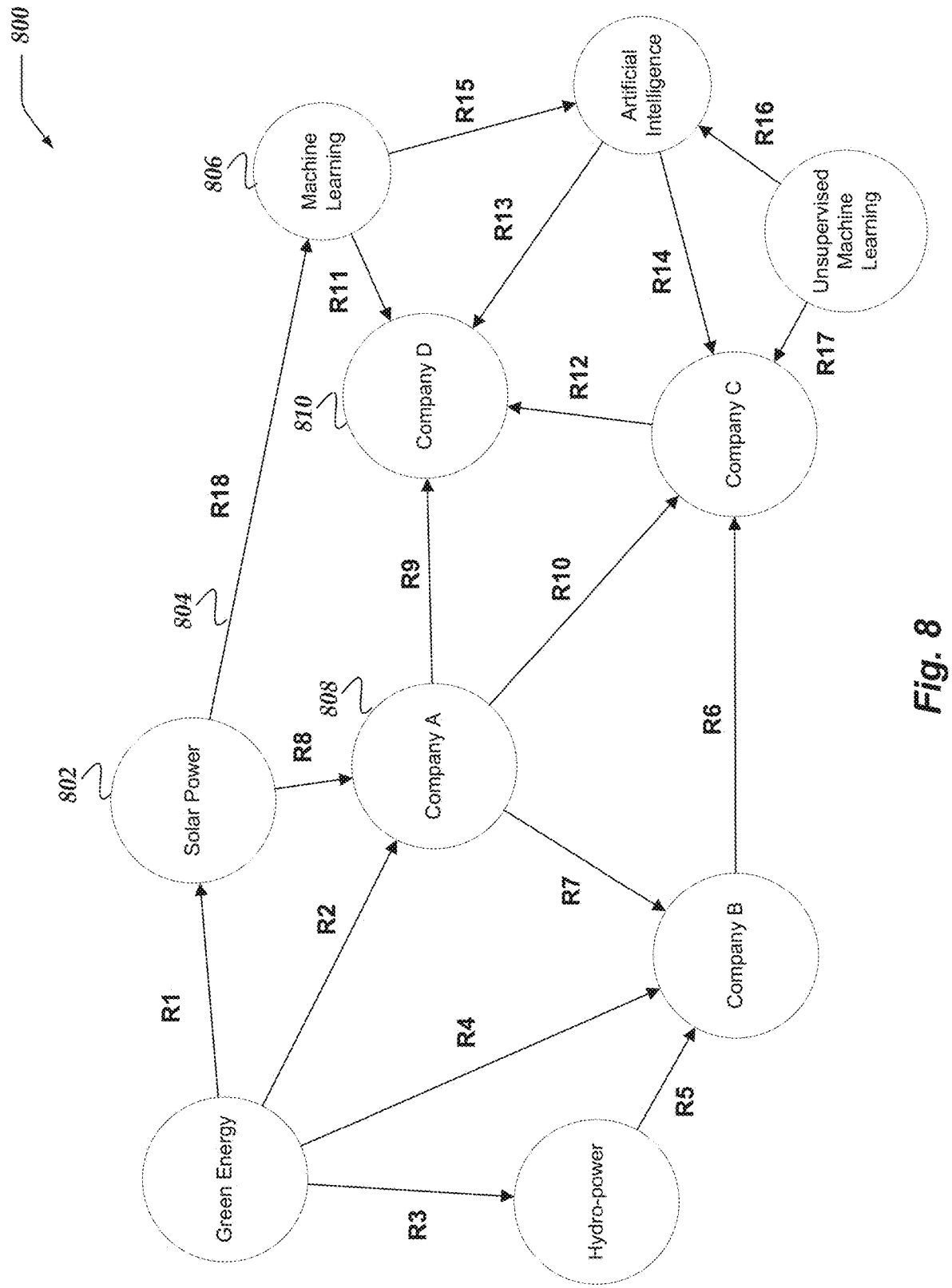
FIG. 8 illustrates a logical schematic of a portion of a data graph for associating thematic concepts and organizations in accordance with one or more of the various embodiments.

FIG. 8 illustrates a logical schematic of a portion of data graph 800 for associating thematic concepts and organizations in accordance with one or more of the various embodiments.

In one or more of the various embodiments, data graphs may include one or more nodes that each correspond to an entity, concept, or the like. In some embodiments, edges in data graphs may represent one or more relationships between the entities included in the data graphs or the concepts included in the data graphs. Accordingly, in some embodiments, ingestion engines may be arranged to generate data graphs based on a synthesis of concept graphs and entity graphs.

Thus, in this example, data graph 800 includes concepts from concept graph 600 and entities from entity graph 700.

For example, data graph 800 include solar power (node 802) and machine learning (node 806) which could be from concept graph 600 and company A (node 808) and company D (node 810) which could be from entity graph 700.

However, in one or more of the various embodiments, data graphs may include one or more relationships that do not exist in concept graphs or entity graphs. In this example, for some embodiments, relationship 804 represents a relationship between the concepts solar power and machine learning that does not exist in concept graph 700. Here, in this example, the two concepts may be considered related because of one or more relationships between company A (node 808) and company D (node 810), or the like.

Generalized Operations for Data Ingestion

FIGS. 9-13 represent generalized operations for associating thematic concepts and organizations in accordance with one or more of the various embodiments. In one or more of the various embodiments, processes 900, 1000, 1100, 1200, and 1300 described in conjunction with FIGS. 9-13 may be implemented by or executed by one or more processors on a single network computer, such as network computer 300 of FIG. 3. In other embodiments, these processes, or portions thereof, may be implemented by or executed on a plurality of network computers, such as network computer 300 of FIG. 3. In yet other embodiments, these processes, or portions thereof, may be implemented by or executed on one or more virtualized computers, such as, those in a cloud-based environment. However, embodiments are not so limited and various combinations of network computers, client computers, or the like may be utilized. Further, in one or more of the various embodiments, the processes described in conjunction with FIGS. 9-13 may perform actions for associating thematic concepts and organizations in accordance with at least one of the various embodiments or architectures such as those described in conjunction with FIGS. 4-8. Further, in one or more of the various embodiments, some or all of the actions performed by processes 900, 1000, 1100, 1200, and 1300 may be executed in part by ingestion engine 322, portfolio engine 324, indexing engine 326, scoring engine 327, or the like.

Figure 9:
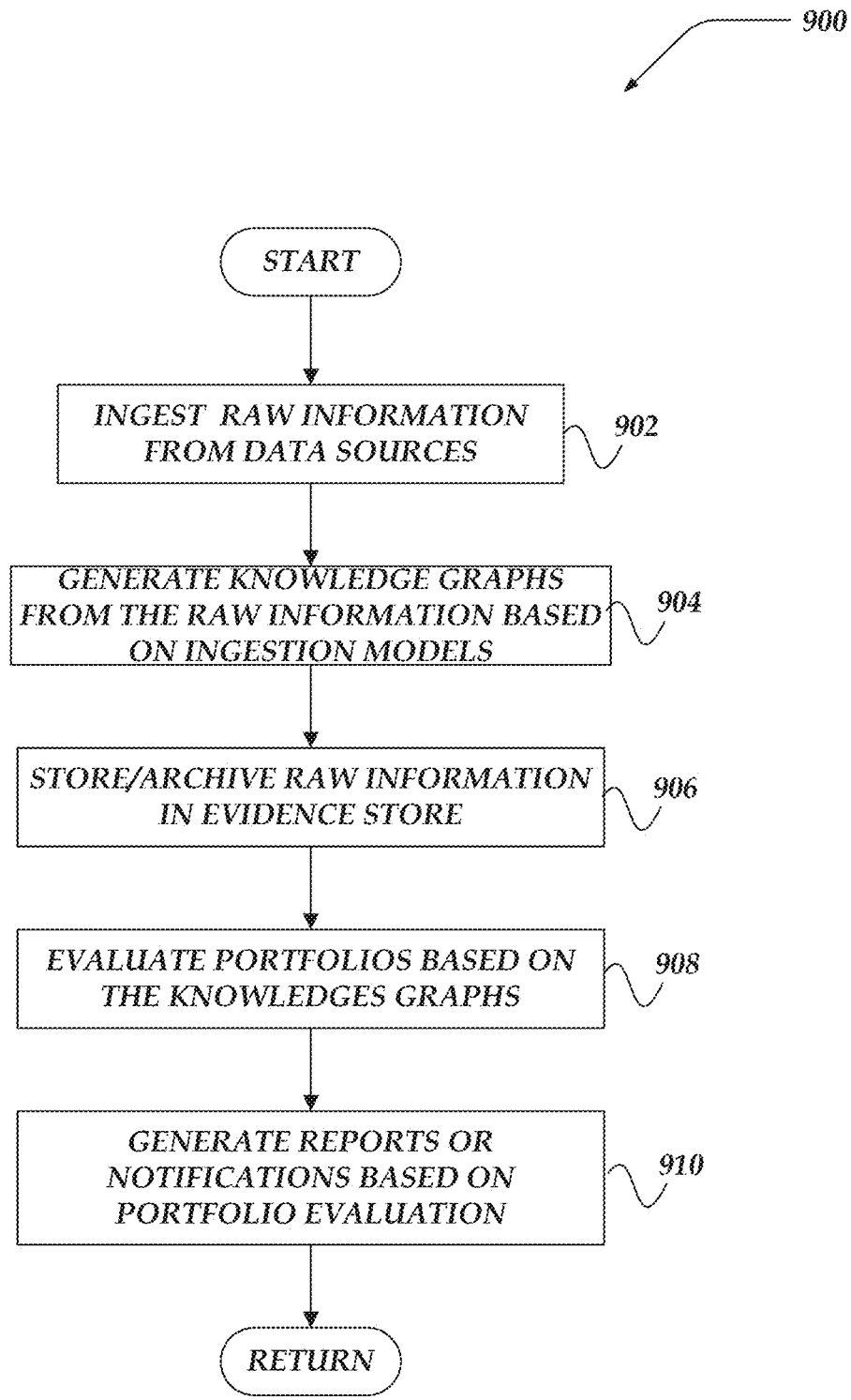
FIG. 9 illustrates an overview flowchart for a process for associating thematic concepts and organizations in accordance with one or more of the various embodiments.

FIG. 9 illustrates an overview flowchart for process 900 for associating thematic concepts and organizations in accordance with one or more of the various embodiments. After a start block, at block 902, in one or more of the various embodiments, ingestion engines may be arranged to ingest raw information from one or more data sources. As described above, in some embodiments, ingestion engines may be arranged to connect with one or more data sources that may provide raw information. In some embodiments, raw information may include live/real-time streams, such as, news feeds, financial activity information, consumer sentiment information, market reports, or the like. In some embodiments, one or more data sources may periodically provide raw information, such as, private/public newsletters, private/public reports, or the like. Also, in some embodiments, one or more data sources may provide one or more curated lists, collections, or databases of information. These may include reports, summaries, predictions, forecasts, or the like, curated by one or more industry/topic experts.

At block 904, in one or more of the various embodiments, ingestion engines may be arranged to generate one or more knowledge graphs from the raw information based on one or more ingestion models. In one or more of the various embodiments, ingestion engines may be arranged to employ one or more ingestion models to generate one or more knowledge graphs from the information provided by data sources.

In some embodiments, ingestion engines may be arranged to generate concept graphs, one or more entity graphs, or one or more data graphs. In some embodiments, concept graphs may represent concepts and relationships between concepts. In some embodiments, entity graphs may be arranged to represent entities and their relationships with each based on one or more characteristics of the entities. In some embodiments, entities may be organizations, companies, government agencies, educational institutions, or the like.

At block 906, in one or more of the various embodiments, ingestion engines may be arranged to store or archive the raw information in one or more evidence data stores.

In one or more of the various embodiments, while ingestion engines may be arranged to execute a variety of actions such as transforming, indexing, cleaning, formatting, or the like, on the ingested information, the original raw information may be captured or preserved in an archival data source. In some embodiments, the archived information may be associated with one or more nodes or relationships in one or more knowledge graphs. Thus, in some embodiments, users may be enabled to drill down to source documents from portions of the various knowledge graphs.

Likewise, in some embodiments, source documents may be linked to query results or portfolio to provide support regarding why one or more entities may be included in query results or portfolios. Accordingly, in some embodiments, portfolio engines may be arranged to provide one or more interactive reports that enable users to browse or otherwise access the underlying raw information that may be responsible for query results. Similarly, in some embodiments, entities associated with portfolios may be linked to raw information exhibits that may be responsible for indicating a given entities should be included in a portfolio.

At block 908, in one or more of the various embodiments, ingestion engines may be arranged to evaluate one or more portfolios based on the one or more knowledge graphs.

In one or more of the various embodiments, one or more portfolios may be associated with one or more concepts, or themes (e.g., collections of one or more concepts). Likewise, in some embodiments, portfolios may be associated with additional criteria associated with the concepts, such as strength-of-relationship threshold values, balancing rules (e.g., share of portfolio associated with particular concepts or themes may be defined), inclusion/exclusion rules, or the like.

Also, in some embodiments, portfolios may be associated with one or more criteria based on one or more characteristics of the entities, such as, employee count, geographic location, entity type, market size, entity valuation, product type, ownership, leadership, or the like.

Accordingly, in some embodiments, portfolio engines may be arranged to monitor entities or portfolios to identify one or more candidate entities that may be recommended for inclusion in existing portfolios. Likewise, in some embodiments, portfolio engines may be arranged to monitor entities or portfolios to determine one or more entities that may be recommended for removal from one or more portfolios.

Also, in some embodiments, portfolio engines may be arranged to monitor portfolios to determine if one or more portfolios have drifted out of compliance with one or more of the criteria defining the portfolio. For example, if a portfolio is configured to include 30% of entities with strong associations with machine learning and 70% of entities with strong associations with green energy, portfolio engines may be arranged to periodically evaluate if the entities in the portfolio conform to the desired balance.

At block 910, in one or more of the various embodiments, ingestion engines may be arranged to generate one or more reports or notifications regarding the evaluation of the one or more portfolios.

In one or more of the various embodiments, such reports may include one or more entities that may be recommended for inclusion with exclusion from one or more portfolios. Likewise, in some embodiments, reports may include one or more portfolios that fail to conform with one or more criteria used to establish the portfolios. For example, a portfolio that is configured to exclude members that are closely associated Company X may be flagged for review if one or more members establishes a violating relationship with Company X.

Next, in one or more of the various embodiments, control may be returned to a calling process.

Figure 10:
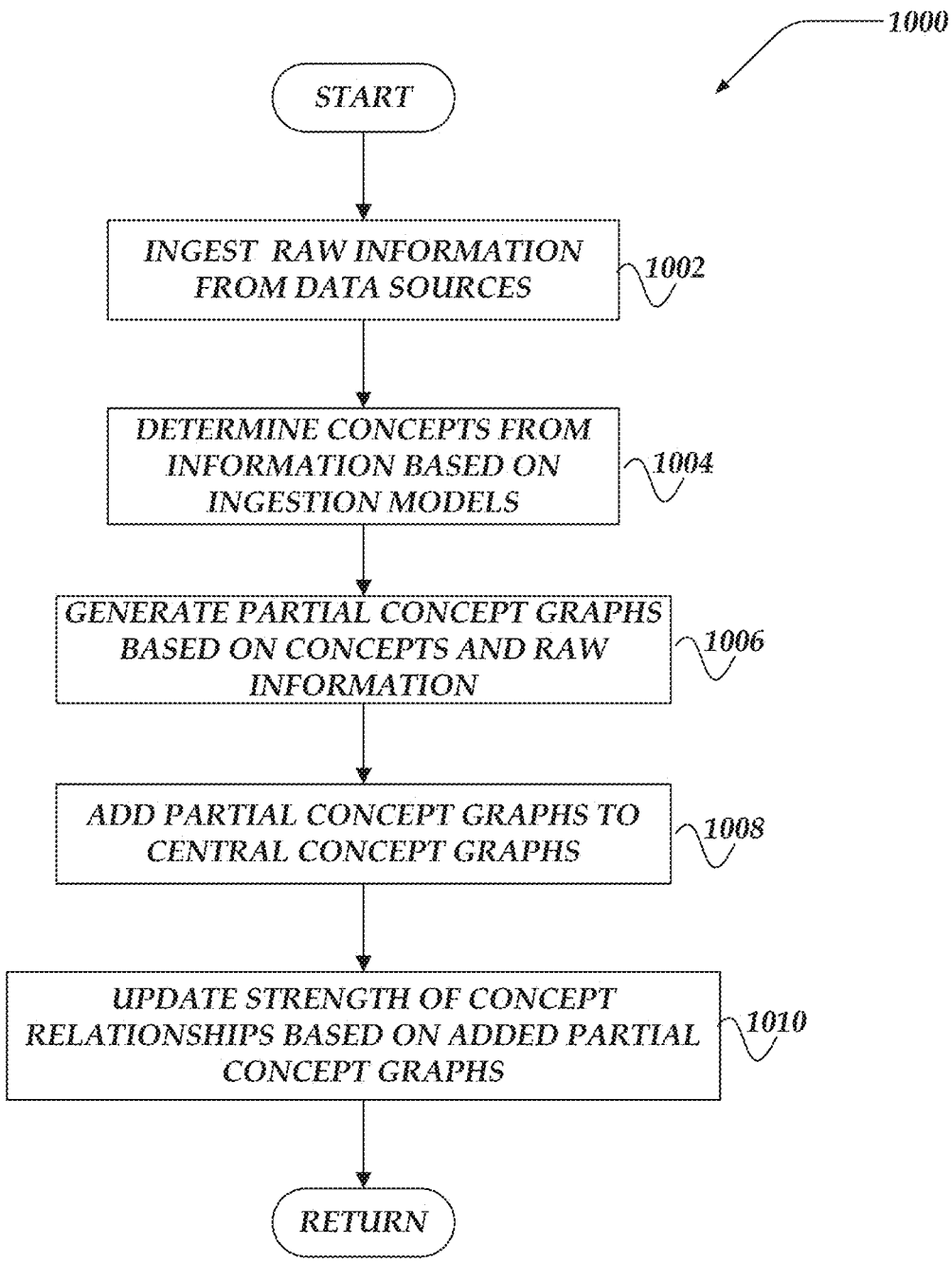
FIG. 10 illustrates a flowchart for a process for associating thematic concepts and organizations in accordance with one or more of the various embodiments.

FIG. 10 illustrates a flowchart for process 1000 for associating thematic concepts and organizations in accordance with one or more of the various embodiments. After a start block, at block 1002, in one or more of the various embodiments, ingestion engines may be arranged to ingest raw information from one or more data sources. See, raw information ingestion discussed above.

At block 1004, in one or more of the various embodiments, ingestion engines may be arranged to determine one or more concepts from the information based one or more ingestion models.

In one or more of the various embodiments, ingestion engines may be arranged to employ one or more ingestion models to determine concepts or concept relationships from raw information.

In some embodiments, ingestion models may be arranged to employ one or more heuristics, machine learning classifiers, natural language processing (NLP), or the like, to determine concepts in a given portion of raw information.

In one or more of the various embodiments, ingestion engines may be arranged to employ one or more parsers, grammars, decoders, or the like, to extract natural language text from the raw information. Likewise, in some embodiments, one or more ingestion models may be arranged to include specific heuristics, parsers, grammars, classifiers, pattern matchers, or the like, for processing raw information. Thus, in some embodiments, if a new type of raw information may be added to the portfolio platform, one or more ingestion models may be added to process the new type of raw information to identify concepts.

In one or more of the various embodiments, ingestion engines may be arranged to employ one or more taxonomies or ontologies that identify one or more concepts and the one or more text words that may be associated with a given topic. In some embodiments, portfolio platform may be arranged to enable users to modify taxonomies, or the like, to include/exclude one or more concepts from consideration. Likewise, in some embodiments, users may be enabled to modify the text words that may be associated with a given concept.

At block 1006, in one or more of the various embodiments, ingestion engines may be arranged to generate one or more partial concept graphs based on the raw information and the one or more ingestion models.

In one or more of the various embodiments, individual portions of raw information may be processed separately to identify concepts or concept relationships included in each portion of raw information. Accordingly, in some embodiments, while the concepts may be derived from central taxonomies, a partial concept graph may be generated individually for some or all portions of raw information. Thus, for example, if the raw information under consideration is a two page document, the ingestion engine may produce a partial concept graph that includes the concepts or concept relationships produced from natural language included in the two page document.

In one or more of the various embodiments, partial concept graphs may include strength of relationship values for the various concept relationships determined from each portion of raw information.

At block 1008, in one or more of the various embodiments, ingestion engines may be arranged to add the one or more partial concept graphs to a main concept graph. In some embodiments, ingestion engines may be arranged to generate one or more central concept graphs for each portfolio platform. In some embodiments, portfolio platforms may be multi-tenant systems such that two or more organizations share the same portfolio platform service. Also, in some embodiments, organizations may be enabled to operate separate or private portfolio platforms that may be hosted in private cloud environments, on-premises servers, or a combination thereof.

In some embodiments, portfolio platforms configured for multi-tenant operation may be arranged to keep knowledge graphs of different tenants isolated or quarantined. Alternatively, in some embodiments, central concept graphs may be shared across multiple tenants.

In one or more of the various embodiments, ingestion engines may be arranged to add the one or more partial concept graphs determine from raw information into one or more central concept graphs. In some embodiments, central concept graphs may be comprised of concepts or concept relationships discovered in raw information. Accordingly, in some embodiments, the one or more partial concept graphs determined from ingested raw information may be added to the one or more central concept graphs.

In one or more of the various embodiments, if the partial concept graphs include concepts that may be missing or absent from central concept graphs, those concepts may be added to central concept graphs. Similarly, in some embodiments, concept relationships that may be absent from central concept graphs may be added to central concept graphs.

Accordingly, in some embodiments, overtime as raw information may be continuously processed, ingestion engines may be arranged to continuously add partial concept graphs to central concept graphs.

At block 1010, in one or more of the various embodiments, ingestion engines may be arranged to update the strength of one or more relationships in the concept graph based on the added partial concept graphs.

In one or more of the various embodiments, ingestion engines may be arranged to keep a count of the number times concepts or concept relationships may be determined from raw information. Accordingly, in some embodiments, nodes in concept graphs may be associated with a counter value that may be incremented as duplicate concepts may be discovered. Likewise, in some embodiments, edges in concept graphs may be associated with another counter value that may be incremented as concept relationships are observed.

Accordingly, in some embodiments, as concepts or concept relationships may be added to concept graphs, ingestion engines may be arranged to update a strength of relationship score that may be associated with concept relationship.

Thus, in some embodiments, the number of times a particular concept relationship may be determined from raw information may be employed as a term for determining the strength of relationship score. In some embodiments, ingestion engines may be arranged to employ additional terms or expressions, such as, time decay, source weights, content type weights, or the like, that may be considered for computing strength of relationship scores.

In some embodiments, ingestion engines may be arranged to enable different organizations to define or modify one or more parameters or expressions associated with determining strength of relationship scores. For example, organization A may value information from source A more than source B. Accordingly, in this example, organization A may be enabled to configure one or more parameter values that may be employed to reduce the impact on strength of relationship scores of partial concept graphs associated with source B as compared to source A.

Accordingly, in some embodiments, ingestion engines may be arranged to determine rules, expressions, or the like, for determining strength of relationship scores from configuration information to account for local circumstances or local requirements.

Next, in one or more of the various embodiments, control may be returned to a calling process.

Figure 11:
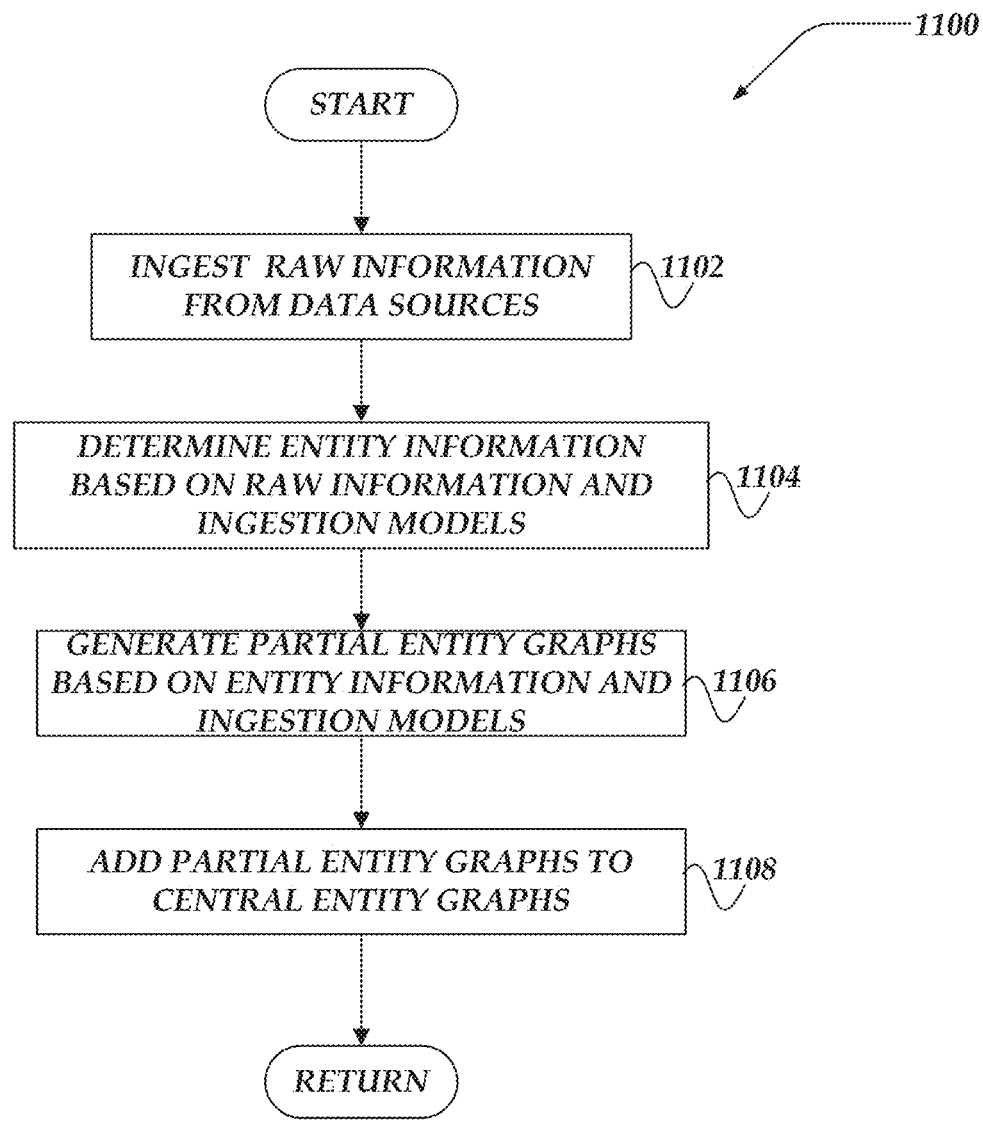
FIG. 11 illustrates a flowchart for a process for associating thematic concepts and organizations in accordance with one or more of the various embodiments.

FIG. 11 illustrates a flowchart for process 1100 for associating thematic concepts and organizations in accordance with one or more of the various embodiments. After a start block, at block 1102, in one or more of the various embodiments, as described above, ingestion engines may be arranged to ingest raw information from one or more data sources.

At block 1104, in one or more of the various embodiments, ingestion engines may be arranged to determine entity information based on the raw information and one or more ingestion models. In one or more of the various embodiments, entity information may be considered information or evidence that may assert or infer one or more facts associated with entities.

In some embodiments, ingestion engines may be arranged to ingestion models that may be tailored to determining entity information. In some embodiments, ingestion models may be arranged to include regular expressions, classifiers, or the like, that can determine one or more specific types of evidence associated with various entities. Also, in some embodiments, ingestion engines may be arranged to employ ingestion models that include or access one or more databases of entity information that may be employed to identify or confirm entity information. For example, in some embodiments, one or more ingestion models may be arranged to compare words from raw information to database of corporations, trademarks, product names, or the like, to determine names of entities that may be referenced in the ingested information.

In one or more of the various embodiments, ingestion engines may be arranged to determine a variety of different types of entity attributes from the ingested information. In some embodiments, attributes may include one or more of, geographic location, product types, market size, industry, number of employees, number of offices/locations, form of entity (e.g., corporation, partnership, limited liability company, association, or the like), type of entity, (e.g., for-profit business, non-profit business, educational institution, government agency/department, or the like), number of employees, board members, officers, partnerships, trademarks, patents/patent applications, or the like.

In one or more of the various embodiments, one or more ingestion models may be tailored for discovering or confirming one or more of the attributes. In some embodiments, different organizations may be more or less interested in some attributes. Accordingly, in some embodiments, different organizations may require or provide one or more ingestion models that may be arranged to identify one or more particular attributes that other organizations may be uninterested in.

In one or more of the various embodiments, ingestion engines may be arranged to enable organizations (e.g., users) to selectively determine some or all of the entity attributes they may be interested in. In some embodiments, ingestion engines may be arranged to employ one or more external or remote services for obtaining or confirming one or more entity attributes. In some embodiments, ingestion engines may be arranged to provide entity names to one or more external services that may provide a variety of attributes associated with the provided entity names. For example, for some embodiments, ingestion engines may be arranged to submit entity names to a government financial reporting database to collect various attributes that may be collected and published by the government.

In some embodiments, one or more ingestion models may be arranged to include natural language processing that identifies candidate evidence (e.g., words, phrases) that may be verified based on one or more entity-related databases. For example, candidate corporation names may be checked against relevant corporate registries. Likewise, for example, ingestion models may be arranged to determine particular entity attributes, such as, board members, officers, investors, key employees, or the like, by searching one or more entity-related databases using the evidence found in the raw information.

At block 1106, ingestion engines may be arranged to generate one or more partial entity graphs based on the entity information and the one or more ingestion models. Similar to how partial concept graphs may be generated from portions of raw information, in some embodiments, partial entity graphs may be generated from portions of raw information.

In one or more of the various embodiments, ingestion engines may be arranged to employ one or more ingestion models that may be configured to determine or evaluate various relationships between entities. In some embodiments, entities may be associated with a variety of attributes some or all of which may infer or assert one or more relationships with other entities.

Accordingly, in some embodiments, relationships between entities may be based on bundle of individual relationships that may be individually considered or evaluated. For example, in some embodiments, entities located in the same town may be related based on geographic location; entities that share board members may be related based on the shared board members; entities that are engaging in litigation may be related because of shared litigation; entities that sell the same product or compete in the same market may be considered related, and so on.

In one or more of the various embodiments, one or more ingestion models may be specialized to identify specific relationships between entities.

In some embodiments, one or more ingestion models may be arranged to determine one or more relationships between entities based on information from third party of external sources rather than exclusively form raw information provided by data sources. For example, for some embodiments, an ingestion model may be configured to employ geographic information associated with an entity to lookup other entities that may be related based on geographic location by submitting address information discovered in raw information to one or more databases. Thus, in some embodiments, information used to determine entity relationships may be obtained from source outside of the provide raw information.

At block 1108, in one or more of the various embodiments, ingestion engines may be arranged to add the one or more partial entity graphs to a main entity graph.

In some embodiments, similar to how partial concept graphs may be added to central concept graphs, partial entity graphs may be added to one or more central entity graphs.

However, in one or more of the various embodiments, ingestion engines may be arranged to enable strength of relationship scores for entities to be computed differently depending on the particular types of relationships as well as the number of the time same relationship is observed.

For example, in some embodiments, entities related because one entity is a wholly owned subsidiary of the other may be considered to have a strength of relationship score that exceeds two entities related because they are located in the same building.

Further, in one or more of the various embodiments, ingestion engines may be arranged to compute different strength of relationship scores for different relationships based on the different attributes two related entities. Accordingly, in some embodiments, relationships based on different attributes may be considered different dimensions of the overall relationship. In some embodiments, ingestion engines may be arranged to provide combined strength of relationship scores of related entities by combining one or more strength of relationship scores that may be associated with the one or more dimensions of their relationship.

Next, in one or more of the various embodiments, control may be returned to a calling process.

Figure 12:
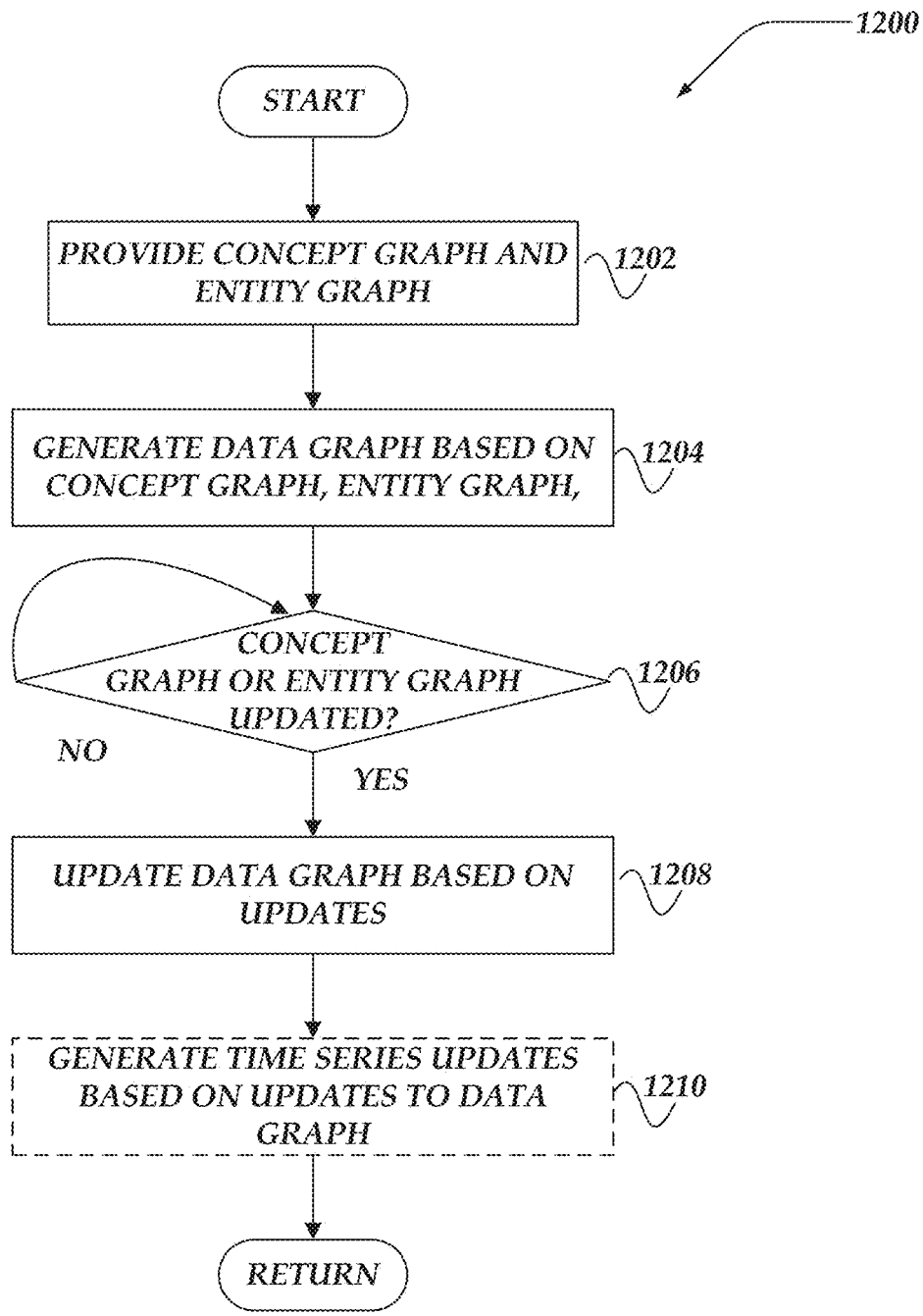
FIG. 12 illustrates a flowchart for a process for associating thematic concepts and organizations in accordance with one or more of the various embodiments.

FIG. 12 illustrates a flowchart for process 1200 for associating thematic concepts and organizations in accordance with one or more of the various embodiments. After a start block, at block 1202, in one or more of the various embodiments, ingestion engines may be arranged to provide a concept graph and an entity graph.

As described above, ingestion engines may be arranged to generate or maintain one or more concept graphs and one or more entity graphs based on ingested information, curated information, configuration information, or the like, provided via one or more data sources.

At block 1204, in one or more of the various embodiments, ingestion engines may be arranged to generate a data graph based on the concept graph and entity graph.

In one or more of the various embodiments, data graphs may be another knowledge graph based on one or more concept graphs and one or more entity graphs Accordingly, in some embodiments, ingestion engines may be arranged to merge concept graphs with entity graphs to provide data graphs that include concepts, concept relationships, entities, entity relationship, or the like.

In one or more of the various embodiments, ingestion engines may be arranged to generate one or more relationships between concepts and entities. In one or more of the various embodiments, ingestion engines may be arranged to employ one or more ingestion models, or the like, that may be arranged to execute one or more rules, instructions, or the like, for generating data graphs from combining concept graphs and entity graphs.

Accordingly, in one or more of the various embodiments, ingestion models may be arranged to relate entities with concepts based on one or more attributes of the entities. For example, in some embodiments, an entity (e.g., company) that produces solar panels may be associated with the concept 'solar power,' or the like.

Also, in some embodiments, one or more ingestion models may be arranged to evaluate raw information that may associate one or more concepts with one or more entities based on communications by or about entities. Thus, in some embodiments, press releases expressing an entity's support for various initiatives, technologies, social issues, or the like, may determine one or more relationships between the entity and one or more related concepts.

In one or more of the various embodiments, ingestion engines may be arranged to generate data graphs that may include one or more relationships that may be omitted from the concept graphs or entity graphs. In some embodiments, during the process of merging concept graphs and entity graphs, ingestion engines may be arranged to determine one or more relationships between concepts based on how the concepts may be related to one or more entities. For example, a new relationship between concepts may be inferred based on the how the concepts relate to one or more entities. For example, one or more concepts associated with two strongly/closely related entities may be considered related based on the strength of relationship score of the related entities.

Likewise, in some embodiments, one or more entities that may be otherwise unrelated, may be related in a data graph because they both are related to some of the same or similar concepts.

Accordingly, in some embodiments, portfolio engines may be arranged to traverse data graphs to gather a full multi-dimensional view of entities and related entities based on concepts and entity attributes.

At decision block 1206, in one or more of the various embodiments, if the concept graph or entity graph may be modified, control may flow to block 1208; otherwise, control may loop back to decision block 1206.

In one or more of the various embodiments, ingestion engines may be arranged to continuously ingest raw information from one or more data sources. Accordingly, in some embodiments, concept graphs or entity graphs may be continuously being updated. Thus, in some embodiments, as concept graphs or entity graphs may be modified, ingestion engines may be arranged to automatically update one or more associated data graphs.

At block 1208, in one or more of the various embodiments, ingestion engines may be arranged to update the data graph based on the updates. As concept graphs or entity graphs may be updated, ingestion engines may be arranged to the nodes or relationships in data graphs to reflect changes that may occur in one or more related concept graphs or entity graphs.

In some embodiments, ingestion engines may be arranged to periodically check for changes to enable more than one change to be processed in batches.

At block 1210, in one or more of the various embodiments, optionally, ingestion engines may be arranged to generate time series updates based on updates to the data graph.

In one or more of the various embodiments, portfolio platforms may be arranged to track how entities may change over time. Accordingly, in some embodiments, as one or more entity attributes change, one or more of the changes may be recorded in a data store that supports time-series information (e.g., time-series data store). Also, in some embodiments, ingestion engines may be arranged to store relationship modifications, changes to strength of relationship scores, or the like, in a time-series data store.

Accordingly, in some embodiments, portfolio engines may be arranged to provide organizations or users reports that include or highlight how changes in entity attributes or relationships have changed over time.

Next, in one or more of the various embodiments, control may be returned to a calling process.

Figure 13:
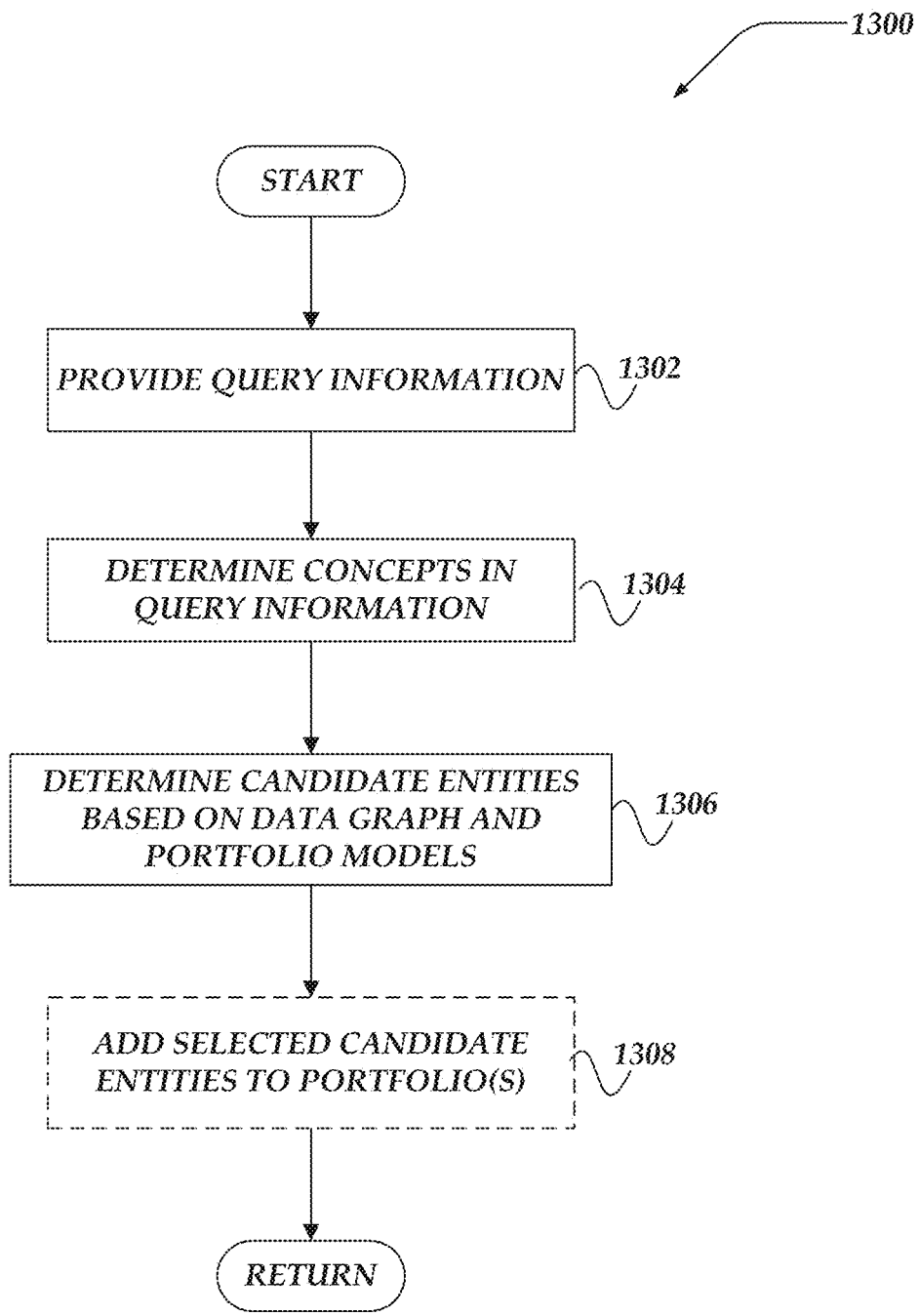
FIG. 13 illustrates a flowchart for a process for associating thematic concepts and organizations in accordance with one or more of the various embodiments.

FIG. 13 illustrates a flowchart for process 1300 for associating thematic concepts and organizations in accordance with one or more of the various embodiments. After a start block, at block 1302, in one or more of the various embodiments, query information may be provided to ingestion engines. In one or more of the various embodiments, portfolio platforms may be arranged to provide one or more user interfaces that enable users to the query information. Also, in one or more of the various embodiments, portfolio engines may be arranged to enable one or more automated services or process to submit query information via one or more interfaces or APIs.

In some embodiments, query information may include discreet collections of concepts, themes, or the like, selected from user interface pick lists, checkbox sets, radio button groups, or the like, or combination thereof.

In one or more of the various embodiments, portfolio engines may be arranged to periodically/automatically run one or more pre-defined queries. For example, for some embodiments, a pre-defined query looking for entities associated with solar power that may be located in particular geographic areas, funded with government grants, and employing 100 or more employees may be executed everyday to identify new entities to consider adding to a portfolio.

At block 1304, in one or more of the various embodiments, portfolio engines may be arranged to determine one or more concepts in the query information In one or more of the various embodiments, portfolio platforms may be arranged to enable query information that includes natural text. Accordingly, in some embodiments, specialized natural language processing may be executed to determine the concepts included in the query information.

In other embodiments, query information may be formatted such that concepts are readily determined based on the format of the query information. For example, in some embodiments, query information may be formatted to include a list of comma separated words representing concepts.

Also, in one or more of the various embodiments, portfolio engines may be arranged to expand one or more concepts included in the query information. In some embodiments, portfolio engines may be arranged to employ concept graphs to identify one or more other concepts that may be related to the one or more concepts included in the query information.

In some embodiments, portfolio engines may be arranged to locate the concept nodes in the concept graph that may correspond to the concepts in the query information. In some embodiments, portfolio engines may be arranged to traverse the concept graph starting at the query information concept nodes to search for one or more related concepts.

In one or more of the various embodiments, portfolio engines may be arranged to continue expanding the search for related concepts based on strength of relationship scores associated with connected concept nodes. Also, in some embodiments, portfolio engines may be arranged to consider the distance from the starting node of the search the determine if the search continue. For example, portfolio engines may be arranged to de-weight strength of relationship scores as the distance from the starting nodes increases. In other embodiments, portfolio engines may be arranged to search for related concepts until a fixed maximum or minimum number of related concepts may be determined.

At block 1306, in one or more of the various embodiments, portfolio engines may be arranged to determine one or more candidate entities based on a data graph and one or more portfolio models.

In one or more of the various embodiments, portfolio engines may be arranged to search data graphs for entities that may be related to the one or more concepts determined from the query information.

At block 1308, in one or more of the various embodiments, optionally, portfolio engines may be arranged to add one or more selected entities to one or more portfolios.

In one or more of the various embodiments, portfolio may be collections of entities that meet constraints or conditions outlined in the query information. In some embodiments, portfolio engines may be arranged to automatically create portfolios for queries such that entities that conform to the query may be automatically added. Likewise, in some embodiments, portfolio engines may be arranged to automatically add one or more entities to one or more portfolios that already exist.

Similarly, in some embodiments, portfolio engines may be arranged to automatically remove one or more entities from one or more portfolios if they may fall out of compliance with query information (e.g., conditions) associated with one or more portfolios.

Note, this block is marked optional because in some cases candidate entities may not be added to portfolios.

Next, in one or more of the various embodiments, control may be returned to a calling process.

Figure 14:
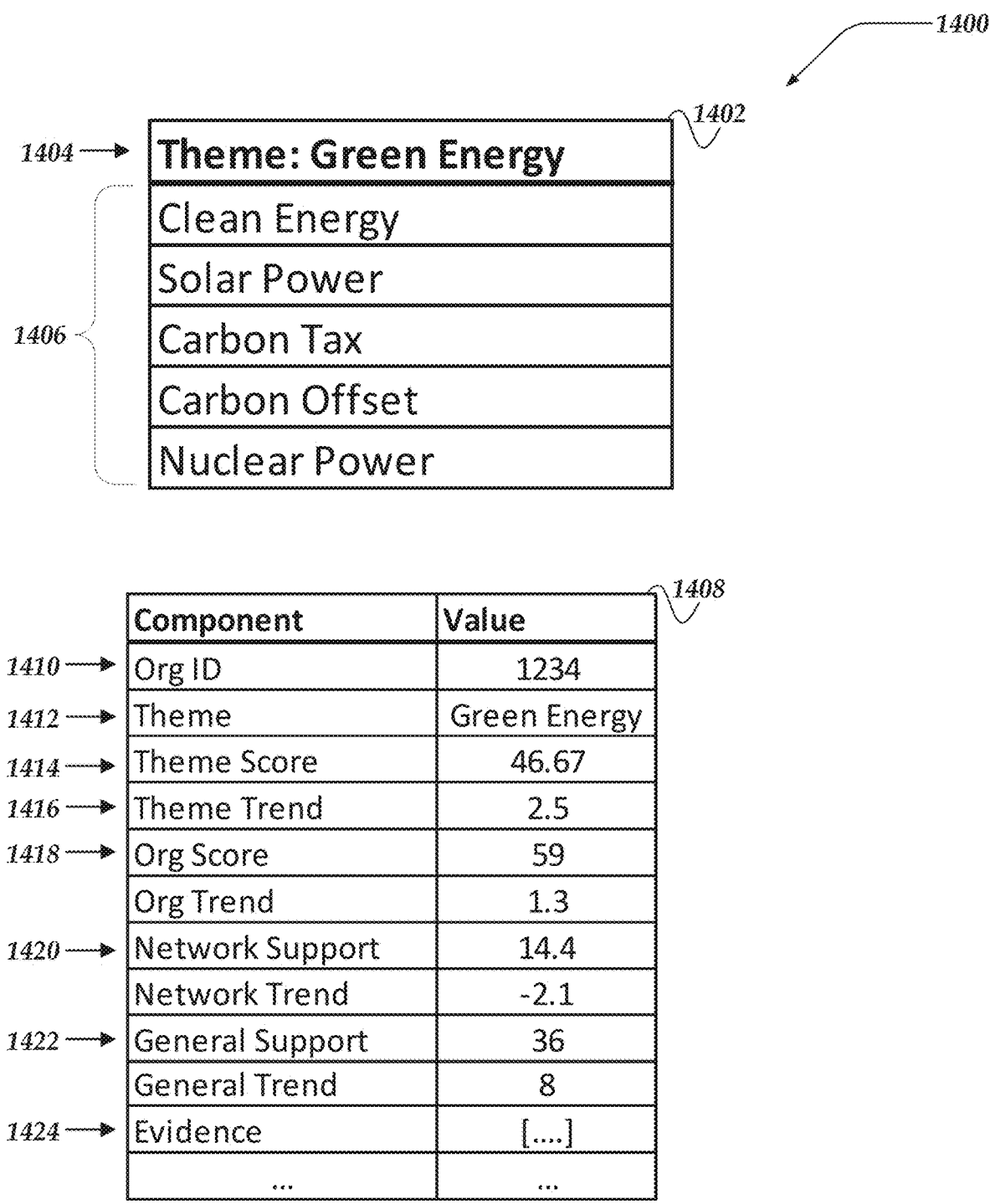
FIG. 14 illustrates a logical schematic of a portion of a system for modeling conformance to thematic concepts in accordance with one or more of the various embodiments.

Illustrative Logical System Architecture for Modeling Conformance to Thematic Concepts FIG. 14 illustrates a logical schematic of a portion of system 1400 for modeling conformance to thematic concepts in accordance with one or more of the various embodiments. In one or more of the various embodiments, portfolio platforms may be arranged to include various data structures for representing concepts, themes, and conformance to concepts or themes.

In one or more of the various embodiments, themes may be considered a collection of one or more concepts. In some embodiments, themes may include one or more concepts that may be related to each other based on relationships determined from concept graphs. In some embodiments, portfolio engines may be arranged to automatically generate themes based on concept graphs. For example, in some embodiments, concepts in concept graphs may be associated into themes based on clustering rules that evaluate the relationships and strength of relationships among concepts. Thus, in some embodiments, some concepts may be automatically grouped into themes. Also, in some embodiments, portfolio engines may be arranged to enable users to define themes based on manually selecting one or more concepts to include a theme. Further, in some embodiments, portfolio engines may be arranged to recommend one or more concepts that may be determined based on filters or searches. Accordingly, in some embodiments, portfolio engines may be arranged to provide one or more user interfaces that enable users to select concepts to associate with themes.

In this example, for some embodiments, theme 1402 represents a data structure that includes some concepts that may be considered part of a theme. In this example, theme 1402 may be considered a collection of concepts that may be related to green energy. In one or more of the various embodiments, themes may limit the number of concepts based on filters based on the strength of relationship among or between the concepts as determined from concept graphs. Also, in some embodiments, other considerations such as, distance (within the concept graph), number of co-relationships, or the like, may be applied to determine the concepts to automatically include or recommend for inclusion into a theme.

In this example, for some embodiments, theme 1402, includes label 1404 that names or describes the theme. Also, in some embodiments, label 1404 may be a concept as well. In this example, label 1404 both describes the theme and includes concept green energy. Also, in this example, concepts 1406 represent the concepts that may be included in theme 1402. In this example, theme 1402 may be considered to be based on the portion of concept graph 600 shown in FIG. 6. However, in this example, theme 1402 illustrates how a theme may exclude one or more otherwise related concepts based on criteria described above or manual intervention. In some embodiments, portfolio engines may be arranged to employ rules, filters, threshold values, instructions, or the like, provided via configuration information to determine the criteria for selecting or recommending concepts to be included themes.

Also, in one or more of the various embodiments, portfolio engines may be arranged to employ one or more data structures, such as, score container 1408 to store information that describes how well an organization or a portfolio of organizations correlate with a given theme. In some embodiments, portfolio engines may be arranged to employ score containers to associate thematic information with organizations or portfolios (e.g., collections of organizations). Note, while one of ordinary skill in the art will appreciate that score containers may be arranged to represent thematic score information for organizations or portfolios, for brevity and clarity, score containers may be described as corresponding to organizations even though some or all score containers may correspond to portfolios comprised of more than one organization.

In some embodiments, score containers, such as, score container 1408 may include fields for storing or referencing various information associated with modeling conformance to thematic concepts. In some embodiments, the particular fields may vary depending on local requirements or local circumstances. Thus, in some embodiments, portfolio engines may be arranged to employ configuration information to determine the exact fields to include score containers. In some embodiments, score container fields may include: field 1410 for storing an identifier or reference to the organization corresponding to the score container; field 1412 for storing a label or description of the theme; field 1414 for storing a thematic score that represents how well the organization matches the theme; field 1416 for storing a trend value that represents if the thematic score is predicted to increase or decrease; field 1418 for storing an organization score that represents how much the activity/messaging (e.g., ingested information) directly associated with the organization matches or is otherwise correlated with theme; field 1420 for storing a score that represents how well other organizations that may be related to the organization may conform to the theme; field 1422 for storing a score representing how activity/messaging of society in general may support the theme; field 1424 for storing references to a samples of evidence that support the scores included in the score container; or the like.

In one or more of the various embodiments, organization scores, network scores, general scores, or the like, may be combined to produce the overall thematic score for the organization. Accordingly, in some embodiments, a thematic score may provide a discrete value that quantifies or models the level of conformance to thematic concepts for an organization.

In one or more of the various embodiments, organization scores may be generated based on evaluating the strength of relationships between the relevant concepts and the organization based on a data graph or other knowledge graphs. Accordingly, in some embodiments, if a theme includes five concepts, the organization score may represent how well the organization conforms to all the concepts. For example, in some embodiments, an organization score may be a weighted average, or the like, of partial scores for each individual concept in a theme.

In one or more of the various embodiments, network scores may represent how well related organizations may conform to the theme. Thus, in some embodiments, network scores may based on a combination of how the network of organizations conform to the relevant concepts. In some embodiments, data graphs or entity graphs may be employed to identify organizations that may considered in the network of the organization of interest. Similar to how concepts may be automatically grouped into themes, the network organizations may be determined based on one or more rules, instructions, or the like, that evaluate the strength of relationships between other organizations and the organization of interest.

In one or more of the various embodiments, general scores may represent the interest or prominence of the theme in the wider public or society. In one or more of the various embodiments, general scores may be determined based on ingesting information from government policy documents, publications from thought leaders, social media trends, opinion pieces, or the like. For example, if a government agency announces a policy to use tax subsidies to increase the uptake of solar energy, the general score associated with a theme that is associated with solar energy may increase.

In one or more of the various embodiments, portfolio engines may be arranged to employ one or more scoring models to compute information to include in score containers. In one or more of the various embodiments, scoring models may be tuned or modified to accommodate local requirements or local circumstances. In some embodiments, portfolio engines may be arranged to employ feedback information to automatically modify scoring models. In some embodiments, feedback information may include passive monitoring of user interaction with theme-based portfolios. For example, in some embodiments, if users demonstrate a preference for the results generated by one scoring model over another, portfolio engines may be arranged to automatically de-ranked or otherwise modify existing scoring models.

Likewise, in some embodiments, if portfolio engines observe that organization scores, network scores, or general scores, generated by one or more scoring models deviate or otherwise become inconsistent, portfolio engines may be arranged to modify the relevant scoring models. Further, in some embodiments, portfolio engines may be arranged to automatically generate alternative scoring models that may be employed to generate alternate thematic scores that may be compared with deployed/active scoring models. For example, in some embodiments, some scoring models may include various weights, scaling, threshold values, or the like, that may impact thematic scores. Accordingly, in some embodiments, portfolio engines may be arranged to automatically (e.g., experimentally) modify these values and compare the results over time with other scoring models.

In one or more of the various embodiments, portfolio engines may be arranged to set a defined range of values for thematic scores, such as, 0-100, or the like. Alternatively, in some embodiments, thematic scores or one or more partial scores may be bucketed into discrete values, such as, NONE, LOW, MED, HIGH, or the like, with value ranges assigned to each discrete value.

In one or more of the various embodiments, portfolio engines may be arranged to provide trend scores based on predicted or historical increases or decreases in scores. In some embodiments, portfolio engines may be arranged to employ predictive models (e.g., sub-models included in or associated with scoring models) to generate the values for trend scores. In some embodiments, trend scores may be correlated with the current or expected rate(s) of change of the corresponding scores.

In one or more of the various embodiments, portfolio engines may be arranged to provide one or more reference to evidence that may be associated with the concepts used to generate thematic scores. In some embodiments, portfolio engines may be arranged to sample a portion of the information or documents collected by the ingestion engine and include references thereto to enable review by users. In some embodiments, portfolio engines may be arranged to randomly select a defined number of evidence references. Also, in some embodiments, portfolio engines may be arranged to apply rules, ranking, filters, or the like, to select evidence references rather than picking them randomly. In some embodiments, criteria for including or excluding evidence references may depend on various features of the evidence, including word counts or other observed characteristics of the evidence. In some embodiments, portfolio engines may be arranged to automatically exclude some evidence based on one or more characteristics or the evidence, including, source, subject matter, sensitivity, reliability, authenticity, format, or the like. In some embodiments, the criteria for including or excluding evidence references may vary depending on users, organizations, or the like. Thus, in one or more of the various embodiments, portfolio engines may be arranged to determine evidence references based on rules, or the like, provided via configuration information to account for local circumstances or local requirements.

Figure 15:
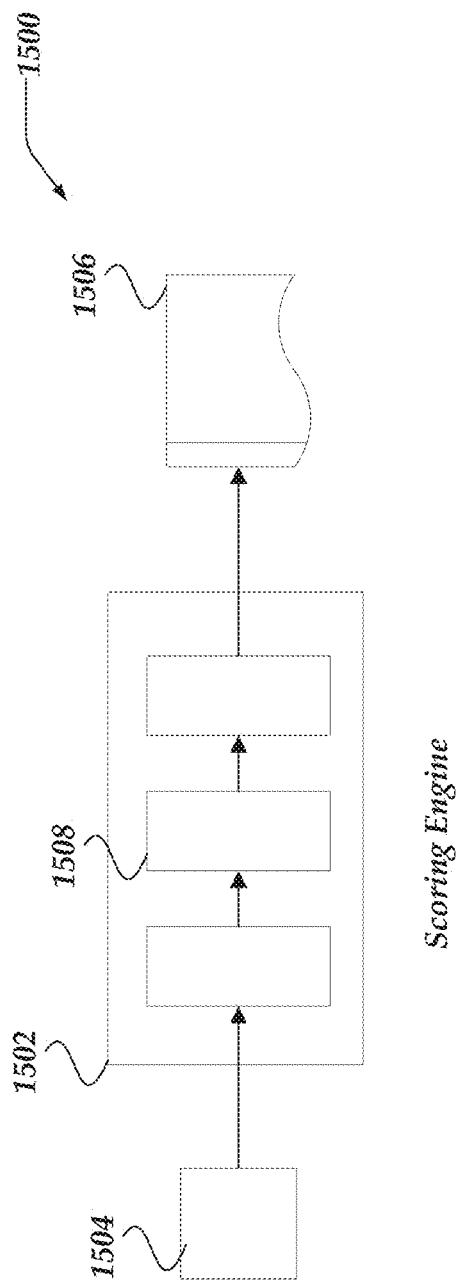
FIG. 15 illustrates a logical schematic of a portion of a scoring system for modeling conformance to thematic concepts in accordance with one or more of the various embodiments.

FIG. 15 illustrates a logical schematic of a portion of scoring system 1500 for modeling conformance to thematic concepts in accordance with one or more of the various embodiments. As introduced above, in one or more of the various embodiments, portfolio platforms may include scoring engines that may be arranged to generate thematic scores for organizations or portfolios. In one or more of the various embodiments, scoring engines, such as, scoring engine 1502 may be arranged to employ one or more scoring models, such as, scoring model 1508, to generate thematic scores, such as 1506. Accordingly, in some embodiments, scoring engines may be arranged to accept inputs, such as, inputs 1504 that may include knowledge graphs, organizations, portfolios, concepts, themes, time series information, historical thematic scores, or the like, and evaluate them using one or more scoring models to generate thematic scores.

Figure 16:
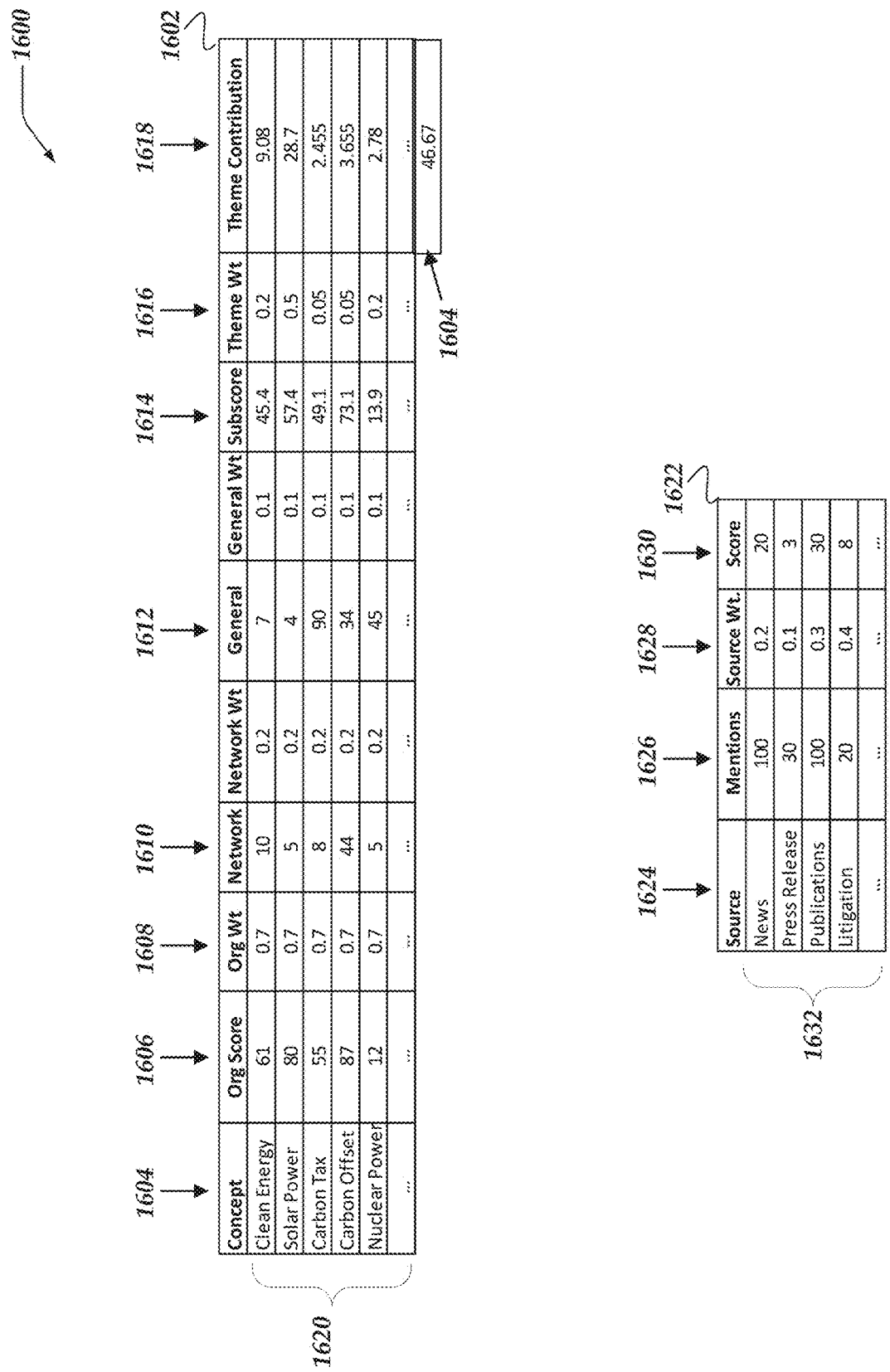
FIG. 16 illustrates a logical schematic of a portion of a scoring system for modeling conformance to thematic concepts in accordance with one or more of the various embodiments.

FIG. 16 illustrates a logical schematic of a portion of scoring system 1600 for modeling conformance to thematic concepts in accordance with one or more of the various embodiments. As described above, portfolio platforms may be arranged to include one or more scoring engines that may employ scoring models to generate thematic scores for organizations or portfolios.

In one or more of the various embodiments, system 1600 includes data structures that illustrate partial or intermediate results that may be generated by scoring models. One of ordinary skill in the art will appreciate that the innovations described herein disclose features for importing or configuring various scoring models via configuration information to account for local requirements or local circumstances. Accordingly, in this example, system 1600 may considered a simplified non-limiting example that illustrates how scoring engines may generate thematic scores.

In this example, for some embodiments, scoring engines may be arranged to generate one or more data structures, such as, data structure 1602 that may be store some or all of the partial results that may contribute the generation of thematic scores. In this example, data structure 1602, includes several columns, including: column 1604 for storing a concept identifier; column 1606 for storing an organization score for each concept in the theme; column 1608 for storing and organization score weight for each concept in the theme; column 1610 for storing a network score for each concept in the theme; column 1612 for storing general scores for each concept in the theme; column 1614 for storing a sub-score for each concept in the theme that is a combination of the organization score, network score, or general score of each concept; column 1616 for storing a concept weight that represent the influence of each concept to the overall theme score; column 1618 for storing partial scores that represent how much each concept contributes to the theme score; or the like. Also, in this example, records 1620 may include a record for each concept in the theme being considered. Note, for clarity and brevity description of some columns have been omitted because their meaning is apparent based on descriptions of similar columns.

Also, in this example, cell 1604 represents the thematic score for the organization under consideration. Similarly, in this example: the theme organization score may be computed based on averaging the concept organization scores included in column 1606; the theme network score may be computed based on averaging the concept network scores included in column 1610; the theme general score may be computed based on averaging the concept general scores included in column 1612; or the like.

In one or more of the various embodiments, scores (e.g., organization, network, general, or the like) may be generated for each concept based on ingested evidence. In one or more of the various embodiments, different sources or types of ingested evidence may carry different weight. Likewise, in some embodiments, different evidence may be evaluated differently. For example, some types of evidence may be scored using various metrics, such as, word counts, topic evaluation, recency, or the like. Accordingly, in some embodiments, scoring models may be arranged to define rules or instructions for evaluating ingested information while generating thematic scores.

In this example, data structure 1622 may be considered a simplified non-limiting example for computing an organization score for the concept Clean Energy. In this example, data structure 1622 includes: column 1624 for storing the source/type indicator of ingested evidence; column 1626 for storing a mention metric that reflects how many time concept related content was discovered in the given evidence; column 1628 for storing a weight value for the different sources/types or evidence; column 1630 for storing a partial score based on each source/type of evidence. Also, in this example, records 1632 may be considered to include records for the different evidence that may have been considered.

Note, in some embodiments, scoring models may be arbitrarily complex depending on the needs or resources available to a portfolio platform. For example, other scoring criteria may be based on traversing one or more knowledge graphs to determine partial scores that may be combined into overall thematic scores. Accordingly, in some embodiments, one of ordinary skill in the art will appreciate the scoring models used in production systems may include more or fewer data structures, columns, records, or the like, than illustrated here. However, one of ordinary skill in the art will appreciate the description herein is at least sufficient for disclosing the innovation described herein.

Figure 17:
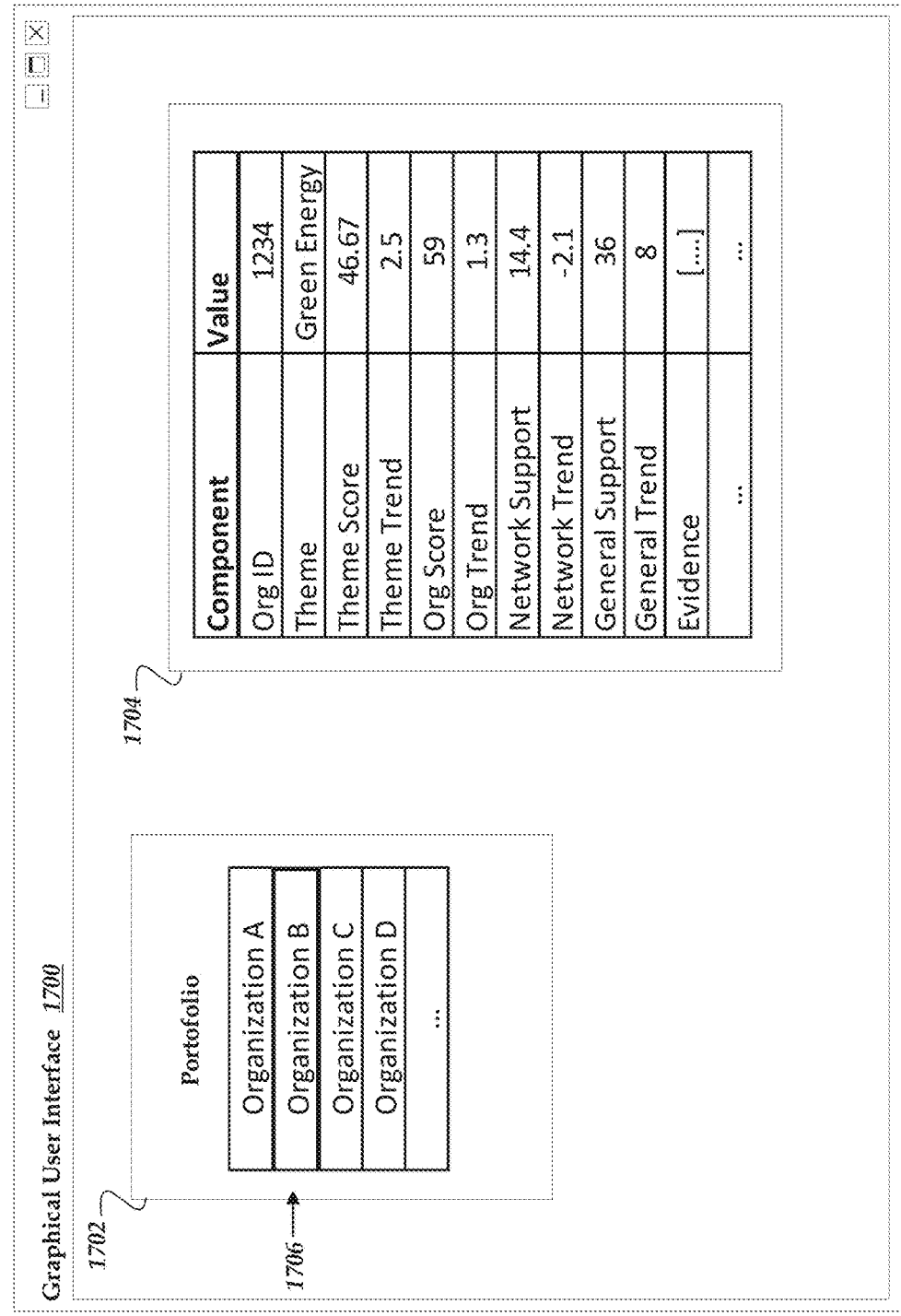
FIG. 17 illustrates a logical representation of a portion of a user interface for modeling conformance to thematic concepts in accordance with one or more of the various embodiments.

FIG. 17 illustrates a logical representation of a portion of user interface 1700 for modeling conformance to thematic concepts in accordance with one or more of the various embodiments. In some embodiments, user interface 1700 may be arranged to include one or more panels, such as, portfolio panel 1702, thematic score panel 1704, or the like.

In one or more of the various embodiments, user interface 1700 may be displayed on one or more hardware displays, such as, client computer displays, mobile device displays, or the like. In some embodiments, user interface 1700 may be provided via a native application or as a web application hosted in a web browser or other similar applications. One of ordinary skill in the art will appreciate that for at least clarity or brevity many details common to commercial/production user interfaces have been omitted from user interface 1700. Likewise, in some embodiments, user interfaces may be arranged differently than shown depending on local circumstances or local requirements. However, one of ordinary skill in the art will appreciate that the disclosure/description of user interface 1700 is at least sufficient for disclosing the innovations included herein.

In this example, portfolio panel 1702 may be employed to display portions of a portfolio that includes various organizations. In this example, the listed organizations represent organizations that may be included in a portfolio that a user may be reviewing. In some embodiments, the particular portfolio shown in portfolio panel may be determined in various ways depending on the user interface. For example, a user interface may include one or more user interface controls that enable users to provide query information that may be employed to search for one or more portfolios.

In this example, thematic score panel 1704 is employed to display one or more portions of a visualization or display thematic score information that may be associated with portfolio item 1706 (e.g., Organization B). In some embodiments, thematic score information may be displayed using visualizations, reports, or the like. Likewise, in some embodiments, thematic score information for more than one organization or more than one portfolios may be displayed in various visualizations, reports, or the like, for display to users. One of ordinary skill in the art will appreciate the other user interfaces, visualizations, or the like, may be employed without departing from the scope of the innovations disclosed herein.

Generalized Operations for Data Ingestion

Figure 18:
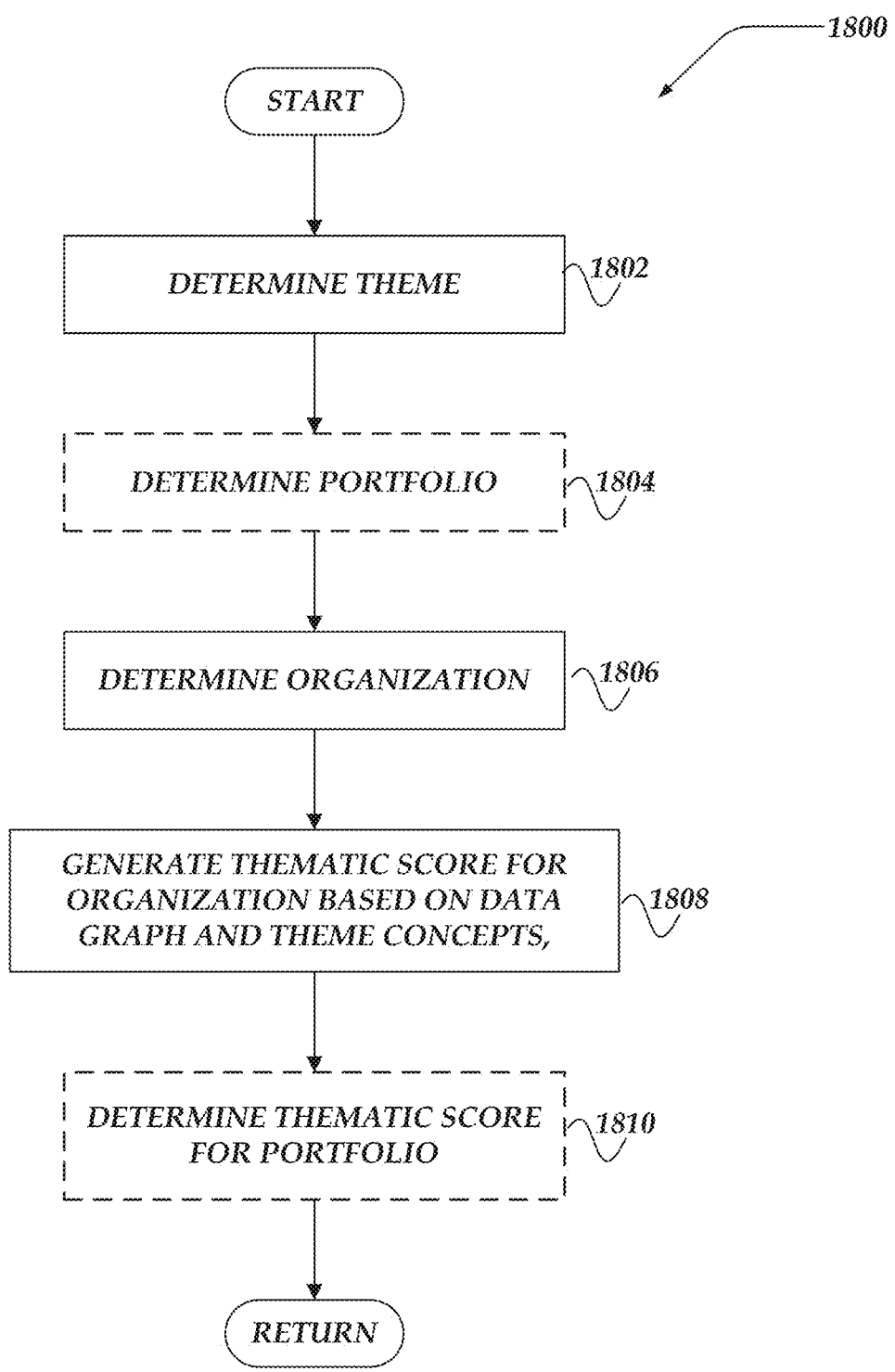
FIG. 18 illustrates an overview flowchart for a process for modeling conformance to thematic concepts in accordance with one or more of the various embodiments.
Figure 19:
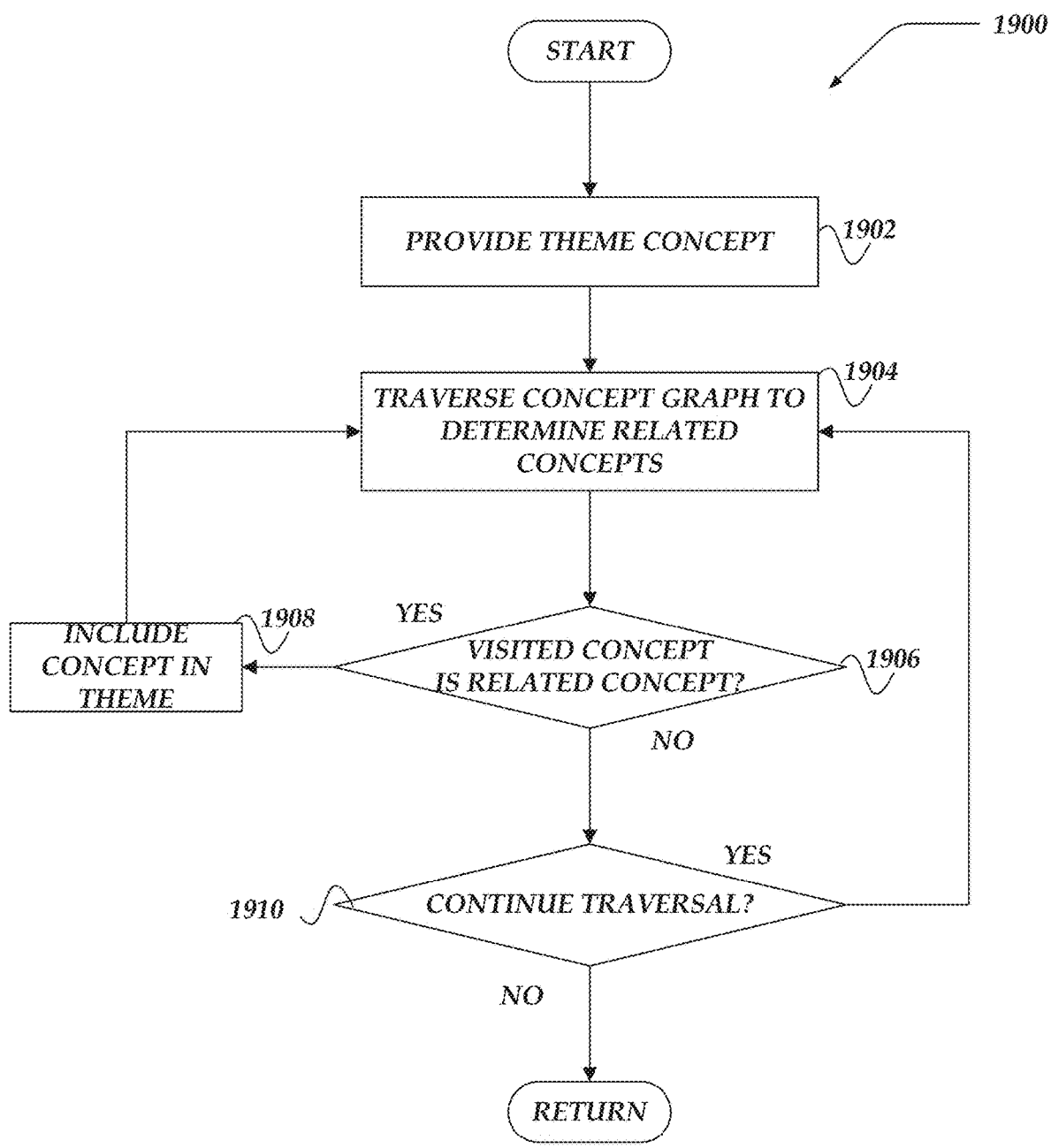
FIG. 19 illustrates a flowchart for a process for determining related concepts that may be associated with a theme for modeling conformance to thematic concepts in accordance with one or more of the various embodiments.
Figure 20:
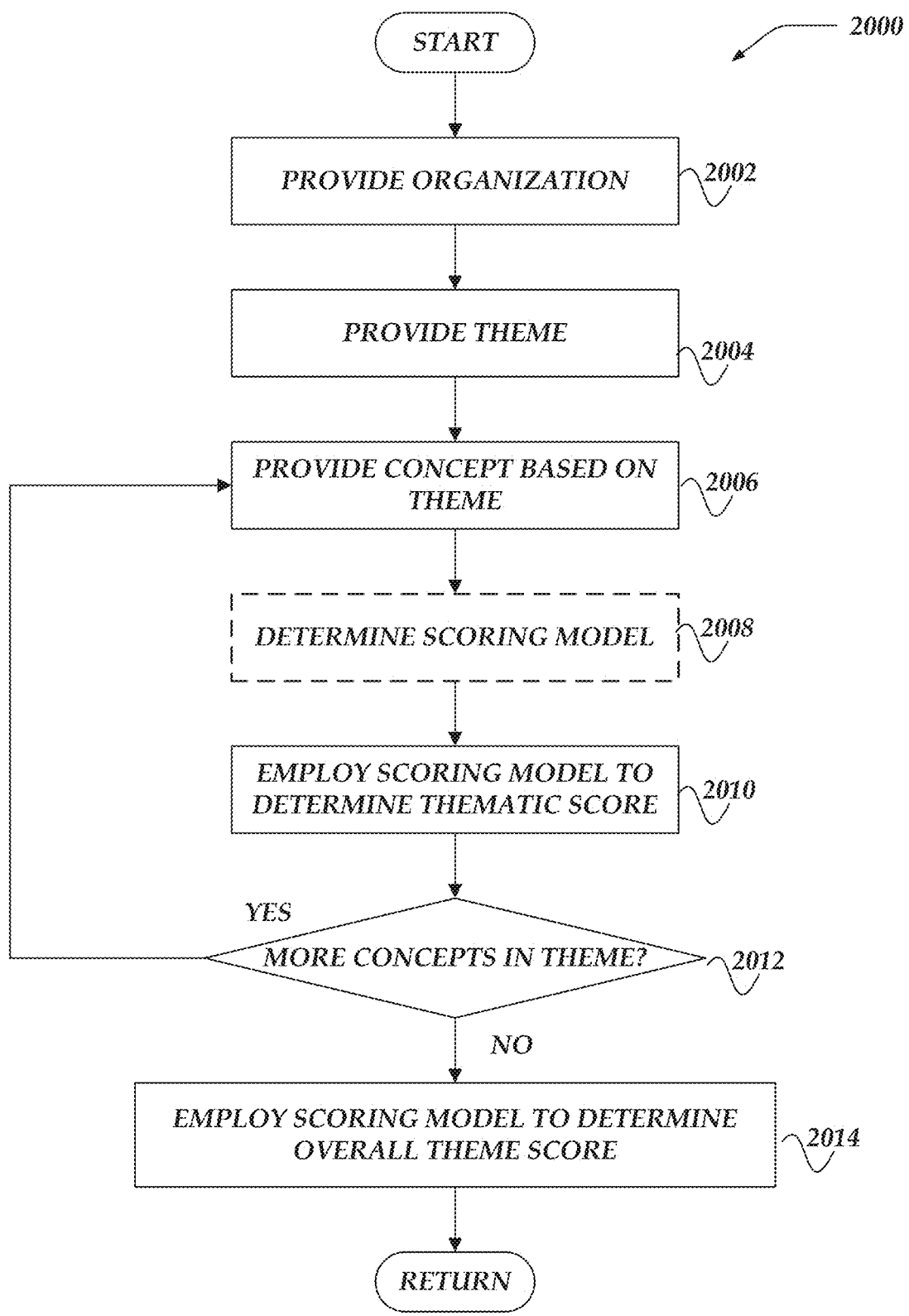
FIG. 20 illustrates a flowchart for a process for modeling conformance to thematic concepts in accordance with one or more of the various embodiments.

FIGS. 18-20 represent generalized operations for modeling conformance to thematic concepts in accordance with one or more of the various embodiments. In one or more of the various embodiments, processes 1800, 1900, and 2000 described in conjunction with FIGS. 18-20 may be implemented by or executed by one or more processors on a single network computer, such as network computer 300 of FIG. 3. In other embodiments, these processes, or portions thereof, may be implemented by or executed on a plurality of network computers, such as network computer 300 of FIG. 3. In yet other embodiments, these processes, or portions thereof, may be implemented by or executed on one or more virtualized computers, such as, those in a cloud-based environment. However, embodiments are not so limited and various combinations of network computers, client computers, or the like may be utilized. Further, in one or more of the various embodiments, the processes described in conjunction with FIGS. 18-20 may perform actions for modeling conformance to thematic concepts in accordance with at least one of the various embodiments, architectures, or processes, such as those described in conjunction with FIGS. 4-17. Further, in one or more of the various embodiments, some or all of the actions performed by processes 1800, 1900, and 20000 may be executed in part by ingestion engine 322, portfolio engine 324, indexing engine 326, scoring engine 327, or the like.

FIG. 18 illustrates an overview flowchart for process 1800 for modeling conformance to thematic concepts in accordance with one or more of the various embodiments. After a start block, at block 1802, in one or more of the various embodiments, portfolio engines may be arranged to determine one or more themes. As described above, in some embodiments, themes may represent one or more concepts that may be grouped or associated with each based on various criteria.

In one or more of the various embodiments, portfolio engines may be arranged to provide one or more user interfaces that enable users to select one or more themes of interest. Also, in some embodiments, portfolio engines may be arranged to automatically select one or more themes based on one or more of rules, triggers, alarms, or the like, that may be determined based on configuration information. In some embodiments, portfolio engines may be arranged to automatically select one or more themes based on one or more of its associated concepts rising in prominence as determined by one or more metrics associated with ingested information.

At block 1804, in one or more of the various embodiments, optionally, portfolio engines may be arranged to determine one or more portfolios. In one or more of the various embodiments, portfolio engines may be arranged to determine one or more portfolios that may be associated with one or more organizations. In some embodiments, portfolio engines may be arranged to provide one or more user interfaces that enable users to select one or more portfolios. Also, in some embodiments, portfolio engines may be arranged to automatically select one or more portfolios based on one or more of rules, triggers, alarms, or the like, that may be determined based on configuration information.

Note, this block is indicated as being optional because in some cases for some embodiments organizations may be processed individually rather than as part of a portfolio.

At block 1806, in one or more of the various embodiments, portfolio engines may be arranged to determine one or more organizations. In some embodiments, portfolio engines may be arranged to provide one or more user interfaces that enable users to select one or more organizations. Also, in some embodiments, portfolio engines may be arranged to automatically select one or more organizations based on one or more of rules, triggers, alarms, or the like, that may be determined based on configuration information.

At block 1808, in one or more of the various embodiments, portfolio engines may be arranged to generate thematic scores for the one or more organizations based on one or more thematic scoring models. In one or more of the various embodiments, portfolio platforms may be arranged to employ one or more scoring engines that may be arranged to employ one or more scoring models to generate thematic scores for the one or more organizations.

As described herein, scoring models may be arranged to employ concept graphs, data graphs, ingested information, user feedback, or the like, to determine thematic scores for organizations.

At block 1810, in one or more of the various embodiments, optionally, portfolio engines may be arranged to determine thematic scores for the one or more portfolios. In one or more of the various embodiments, if a portfolio may be under evaluation, scoring engines may be arranged to generate a thematic score for an entire portfolio. Accordingly, in some embodiments, scoring engines may be arranged to execute one or more actions declared in scoring models to combine the thematic scores of organizations into a thematic score for the entire portfolio. For example, in some embodiments, portfolio engines may be arranged to generate portfolio thematic scores based on averaging the thematic scores of the organizations associated with the portfolio. Likewise, for example, portfolio engines may be arranged to generate portfolio thematic score containers that report the high thematic score, low thematic score, and the average thematic score for the organizations in the portfolio.

Note, this block is indicated as being optional because in some cases for some embodiments, thematic scores may be generated for organizations may be processed individually rather than as part of a portfolio.

FIG. 19 illustrates a flowchart for process 1900 for determining related concepts that may be associated with a theme for modeling conformance to thematic concepts in accordance with one or more of the various embodiments. After a start block, at block 1902, in one or more of the various embodiments, portfolio engines may be arranged to provide one or more theme concepts.

In one or more of the various embodiments, theme concepts may be considered an anchor concept that a theme may be built around. In some embodiments, users or account holder may select a concept that may represent a theme they would like to explore. Accordingly, in some embodiments, the theme concept may be considered a concept that may be employed to discover or generate a theme that include one or more related other concepts that may be related to the provided theme concept.

Also, in one or more of the various embodiments, portfolio engines may be arranged to provide one or more user interfaces that enable users to manually select one or more concepts to include in a theme.

At block 1904, in one or more of the various embodiments, portfolio engines may be arranged to traverse one or more concept graphs to determine one or more related concepts.

As described above, themes may include or associate one or more concepts that may be related. In some embodiments, as described above, portfolio engines may be arranged to employ concept graphs to evaluate if one or more concepts may be related. Accordingly, in some embodiments, portfolio engines may be arranged to employ concept graphs to determine if one or more concepts should be associated with a theme. In one or more of the various embodiments, portfolio engines may be arranged to traverse concept graphs to determine one or more concepts that may be related to the theme concept. In some embodiments, portfolio engines may be arranged to evaluate various metrics, such as, number of relationships to other concepts, strength of relationships to other concepts, or the like, to determine if one or more concepts may be considered or recommended of consideration to include or associate with a theme or theme concept. Accordingly, in some embodiments, portfolio engines may be arranged to determine the rules, threshold values (e.g., minimum strength of relationship, or the like), criteria, or the like, based on configuration information to account for local circumstances or local requirements.

Note, searching for related concepts is described as traversing concept graphs, one of ordinary skill in the art will appreciate that the implementation of the data structures representing concept graph are not limited to conventional graphs with explicit nodes or edges. For example, in some embodiments, concept graphs may be implemented using contiguous memory, optimized indexes, caches, or the like, such that a traversal of the concept graph may include employing index pointers, counters, loops, or the like, that provide a logical traversal of the concept graphs.

At decision block 1906, in one or more of the various embodiments, if a concept visited during the traversal of the one or more concept graphs may be determined to be a related concept, control may flow to block 1908; otherwise, control may flow to decision block 1910.

At block 1908, in one or more of the various embodiments, portfolio engines may be arranged to include the visited concept in the theme. In one or more of the various embodiments, portfolio engines may be arranged to automatically include or associated the related concept into the theme. Also, in one or more of the various embodiments, portfolio engines may be arranged to determine the one or more related concepts and enable users to manually select or confirm if one or more of the candidate related concepts may be included in a theme.

At decision block 1910, in one or more of the various embodiments, if the traversal continues, control may loop back to block 1904; otherwise, control may be returned to a calling process.

Next, in one or more of the various embodiments, control may be returned to a calling process.

FIG. 20 illustrates a flowchart for process 2000 for modeling conformance to thematic concepts in accordance with one or more of the various embodiments. After a start block, at block 2002, in one or more of the various embodiments, portfolio engines may be arranged to provide one or more organizations. As described above, in some embodiments, portfolio engines may be arranged to select or determine one or more organizations using a variety of mechanism. In some embodiments, portfolio engines may be arranged to include one or more user interfaces that provide search tools, filters, query engines, or the like, that users may employ to search for organizations that meet one or more criteria. Also, in some embodiments, portfolio engines may be arranged to select or determine one or more organizations from portfolios that include or associate one or more organizations. One of ordinary skill in the art will appreciate that other mechanism may be employed to select or determine organizations to provide to scoring engines for determining thematic scores. For example, in some embodiments, one or more organizations or portfolio may be stored in favorite lists, saved lists, associated with user accounts, or the like. Further, in some embodiments, portfolio engines may be arranged to enable filters, conditions, triggers, or the like, that may automatically select organizations to provide to scoring engines based on one or more characteristics of the organizations or other metrics that may be observed in ingested information or from other sources.

At block 2004, in one or more of the various embodiments, portfolio engines may be arranged to provide a theme that may be associated with one or more concepts. Similar to how portfolio platforms may employ or provide be a variety of mechanism for select or determine organizations, portfolio platforms may be arranged to employ a variety of mechanism to select or determine themes (e.g., collections of one or more concepts) that may be provided. For example, in some embodiments, portfolio engines may be arranged to enable users or account holders to declare one or more theme that they have interest in. Likewise, in some embodiments, portfolio engines may be arranged to automatically select or determine one or more themes based on ingested information or observed metrics. For example, in one or more of the various embodiments, if a theme includes one or more concepts that rise in prominence, related themes may be selected or determined. For example, in some embodiments, if the number of mentions of one or more concepts in ingested information exceeds a threshold value, portfolio engines may be arranged to provide one or more of the related themes.

Accordingly, in one or more of the various embodiments, portfolio engines may be arranged to provide each theme of interest to a scoring engine to generate thematic scores based on the provided themes.

At block 2006, in one or more of the various embodiments, portfolio engines may be arranged to provide one or more concepts based on the theme. As described above, these may be associated one or more concepts. Accordingly, in some embodiments, scoring engines may be arranged to evaluate each associated concept to generate one or more partial scores that may be employed for generating thematic scores.

At block 2008, in one or more of the various embodiments, optionally, portfolio engines may be arranged to determine one or more scoring models. As described above, scoring models may be data structures that encapsulate rules, instructions, classifiers, sub-models, or the like, for computing thematic scores.

In one or more of the various embodiments, portfolio engines may be arranged to automatically determine scoring models based on various factors, including, users, account holders, organizations, geographic location, or the like. Similarly, in some embodiments, portfolio engines may be arranged to select scoring models based on one or more indirect metrics, such as, risk level, precision, accuracy, or the like. For example, in some embodiments, some scoring models may employ rules/criteria that may be more or less liberal than others.

Likewise, in some embodiments, portfolio engines may be arranged to execute experimental evaluations that employ new or experimental scoring models to compare results with other scoring models.

Note, this block is indicated as being optional because in some embodiments scoring models may be determined previously rather that at block 2008.

At block 2010, in one or more of the various embodiments, portfolio engines may be arranged to employ the one or more scoring models to determine thematic scores for the one or more organizations and one or more concepts. As described above, in some embodiments, scoring engines may be arranged to generate various partial scores or partial results for each pair of concepts or organizations.

In one or more of the various embodiments, scoring engines may be arranged to generate an organization score that evaluates the direct relationships the organizations may have with the concept or its related concepts. Accordingly, in some embodiments, one or more knowledge graphs or data graphs described above may be employed to determine how concepts related to organizations.

In one or more of the various embodiments, scoring engines may be arranged to generate one or more partial scores, such as, organization scores, network scores, general scores, or the like. Also, in some embodiments, scoring models may be arranged to generate one or more additional or supplemental scores or metrics, including, trend values, predicted values, or the like.

In one or more of the various embodiments, scoring engines may be arranged to generate organization scores that represent and quantify the relationship or association between the organization of interest and the concept of interest. In one or more of the various embodiments, the semantic meaning of the organization score may vary depending on the scoring models being employed. However, in one or more of the various embodiments, organization scores may be considered to represent how important or prominent the concept of interest may be to the organization.

Also, as described above, scoring engines may be arranged to generate other partial scores, such as, network score for evaluating the prominence of the concept of interest in other organizations that may be considered in the network of the organization of interest. In some embodiments, portfolio engines may be arranged to determine the organizations that may be in the same network based on the data graph. As described above, portfolio engines may be arranged to determine a network of organizations based on one or more dimensions of relationships that may captured in one or more knowledge graphs.

In one or more of the various embodiments, scoring engines may be arranged traverse one or more concept graphs, entity graphs, data graphs, or the like, to evaluate the prominence or strength of the relationships between concepts and organizations. Note, evaluating relationships between concepts and organizations may be described as traversing one or more knowledge graphs. However, one of ordinary skill in the art will appreciate that the implementation of the data structures representing knowledge graphs are not limited to conventional graphs with explicit nodes or edges. For example, in some embodiments, knowledge graphs may be implemented using contiguous memory, optimized indexes, caches, or the like, such that a traversal of the concept graph may include employing index pointers, counters, loops, or the like, that provide a logical traversal of the knowledge graphs of interest.

Also, in some embodiments, scoring engines may be arranged to determine one or more of the range of the scores values, weights, scaling, leveling, bucketing, or the like, based on the scoring models being employed.

At decision block 2012, in one or more of the various embodiments, if there may be more concepts in the theme, control may loop back to block 2006; otherwise, control may flow to block 2014. As described above, in some embodiments, one or more concepts may be grouped or otherwise associated into a theme. Accordingly, in some embodiments, scoring engines may be arranged to generate thematic scores by scoring/evaluating each concept that may be associated with a theme. Note, in some embodiments, individual concepts may be considered absent an association with a theme. However, in some embodiments, in the case of generating a thematic scores for a single concept, the single concept may be considered a theme.

At block 2014, in one or more of the various embodiments, portfolio engines may be arranged to employ the one or more scoring models to determine an overall theme score for the one or more organizations and the one or more concepts.

As described above, scoring engines may be arranged to employ scoring models to generate one or more partial scores that represent different aspects of the relationship between an organization and one or more concepts. Accordingly, in some embodiments, scoring engines may be arranged to employ the one or more scoring models to determine how to combine the partial scores to provide the values that may be stored in a score container. For example, in some embodiments, organization scores may be weighted higher than general scores, or the like. Likewise, some scoring models may be arranged to weight one or more concepts differently. Accordingly, in some embodiments, scoring engines may be arranged to employ the one or more scoring models to determine the actions or rules for combining the partial scores generated for each concept into thematic scores.

Next, in one or more of the various embodiments, control may be returned to a calling process.

It will be understood that each block in each flowchart illustration, and combinations of blocks in each flowchart illustration, can be implemented by computer program instructions. These program instructions may be provided to a processor to produce a machine, such that the instructions, which execute on the processor, create means for implementing the actions specified in each flowchart block or blocks. The computer program instructions may be executed by a processor to cause a series of operational steps to be performed by the processor to produce a computer-implemented process such that the instructions, which execute on the processor, provide steps for implementing the actions specified in each flowchart block or blocks. The computer program instructions may also cause at least some of the operational steps shown in the blocks of each flowchart to be performed in parallel. Moreover, some of the steps may also be performed across more than one processor, such as might arise in a multi-processor computer system. In addition, one or more blocks or combinations of blocks in each flowchart illustration may also be performed concurrently with other blocks or combinations of blocks, or even in a different sequence than illustrated without departing from the scope or spirit of the invention.

Accordingly, each block in each flowchart illustration supports combinations of means for performing the specified actions, combinations of steps for performing the specified actions and program instruction means for performing the specified actions. It will also be understood that each block in each flowchart illustration, and combinations of blocks in each flowchart illustration, can be implemented by special purpose hardware-based systems, which perform the specified actions or steps, or combinations of special purpose hardware and computer instructions. The foregoing example should not be construed as limiting or exhaustive, but rather, an illustrative use case to show an implementation of at least one of the various embodiments of the invention.

Further, in one or more embodiments (not shown in the figures), the logic in the illustrative flowcharts may be executed using an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. In one or more embodiments, a microcontroller may be arranged to directly execute its own embedded logic to perform actions and access its own internal memory and its own external Input and Output Interfaces (e.g., hardware pins or wireless transceivers) to perform actions, such as System On a Chip (SOC), or the like.

What is claimed as new and desired to be protected by Letters Patent of the United States is:

1. A method for managing data using one or more network computers, wherein one or more processors execute instructions to perform actions, comprising:
   providing a data graph based on one or more knowledge graphs and information provided by one or more data sources;
   providing one or more concepts and one or more entities based on the data graph;
   determining one or more scoring models based on the one or more concepts and the one or more entities;
   providing one or more themes that refer to one or more of a concept that encompasses one or more other concepts, another theme that encompasses one or more concepts that are associated with two or more themes, or a compound theme that includes one or more sub-themes;
   generating one or more thematic scores for the one or more entities based on the one or more themes and the one or more scoring models and the data graph that are associated with the at least portion of the one or more concepts, wherein the one or more thematic scores include one or more values that quantify each relationship between the one or more concepts and the one or more entities, and wherein an entity with a higher thematic score value for a concept has a relationship strength value that exceeds another relationship strength value for another entity with a lower thematic score value for the concept;
   providing one or more user interfaces having tools to search for one or more organizations based on selection of at least one theme that is associated with one or more concepts having a number of mentions above a threshold value; and
   providing a report that includes the one or more thematic scores, the one or more entities, and the one or more concepts.

2. The method of claim 1, wherein generating the one or more thematic scores, further comprises, traversing the data graph to determine the one or more entities that are related to the one or more concepts based on one or more relationships represented in the data graph, wherein the one or more thematic scores are based on the strength of relationship between each entity and each concept.

3. The method of claim 1, wherein providing the one or more entities, further comprises, providing one or more portfolios that include the one or more entities, wherein each included entity contributes one or more partial thematic scores based on the one or more scoring models.

4. The method of claim 1, wherein providing the one or more concepts, further comprises:
   providing a theme based on an anchor concept; and
   traversing a concept graph to determine the one or more concepts based on one or more relationships between the one or more concepts and the anchor concept, wherein each relationship between the anchor concept and the one or more concepts is associated with each relationship strength value that exceeds a threshold value.

5. The method of claim 1, wherein providing the report that includes the one or more thematic scores, further comprises, displaying a value that quantifies a strength of each relationship between the one or more entities and the one or more concepts.

6. The method of claim 1, wherein providing the one or more thematic scores, further comprises:
   employing the one or more scoring models to provide one or more sub-scores for each thematic score based on a weighting that corresponds to a contribution of the one or more sub-scores to the one or more thematic scores; and
   generating one or more score containers that each include one or more values for the one or more weighted sub-scores that correspond to the one or more entities.

7. A system for managing data over a network, comprising:
   a network computer, comprising:
      a memory that stores at least instructions; and
      one or more processors that execute instructions that perform actions, including:
         providing a data graph based on one or more knowledge graphs and information provided by one or more data sources;
         providing one or more concepts and one or more entities based on the data graph;
         determining one or more scoring models based on the one or more concepts and the one or more entities;
         providing one or more themes that refer to one or more of a concept that encompasses one or more other concepts, another theme that encompasses one or more concepts that are associated with two or more themes, or a compound theme that includes one or more sub-themes;
         generating one or more thematic scores for the one or more entities based on the one or more themes and the one or more scoring models and the data graph that are associated with the at least portion of the one or more concepts, wherein the one or more thematic scores include one or more values that quantify each relationship between the one or more concepts and the one or more entities, and wherein an entity with a higher thematic score value for a concept has a relationship strength value that exceeds another relationship strength value for another entity with a lower thematic score value for the concept;
         providing one or more user interfaces having tools to search for one or more organizations based on selection of at least one theme that is associated with one or more concepts having a number of mentions above a threshold value; and
         providing a report that includes the one or more thematic scores, the one or more entities, and the one or more concepts; and
   a client computer, comprising:
      another memory that stores at least instructions; and
      one or more other processors that other execute instructions that perform actions, including:
         displaying the report.

8. The system of claim 7, wherein generating the one or more thematic scores, further comprises, traversing the data graph to determine the one or more entities that are related to the one or more concepts based on one or more relationships represented in the data graph, wherein the one or more thematic scores are based on the strength of relationship between each entity and each concept.

9. The system of claim 7, wherein providing the one or more entities, further comprises, providing one or more portfolios that include the one or more entities, wherein each included entity contributes one or more partial thematic scores based on the one or more scoring models.

10. The system of claim 7, wherein providing the one or more concepts, further comprises:
providing a theme based on an anchor concept; and
traversing a concept graph to determine the one or more concepts based on one or more relationships between the one or more concepts and the anchor concept, wherein each relationship between the anchor concept and the one or more concepts is associated with each relationship strength value that exceeds a threshold value.

11. The system of claim 7, wherein providing the report that includes the one or more thematic scores, further comprises, displaying a value that quantifies a strength of each relationship between the one or more entities and the one or more concepts.

12. The system of claim 7, wherein providing the one or more thematic scores, further comprises:
employing the one or more scoring models to provide one or more sub-scores for each thematic score based on a weighting that corresponds to a contribution of the one or more sub-scores to the one or more thematic scores; and
generating one or more score containers that each include one or more values for the one or more weighted sub-scores that correspond to the one or more entities.

13. A network computer for managing data, comprising:
a memory that stores at least instructions; and
one or more processors that execute instructions that perform actions, including:
providing a data graph based on one or more knowledge graphs and information provided by one or more data sources;
providing one or more concepts and one or more entities based on the data graph;
determining one or more scoring models based on the one or more concepts and the one or more entities;
providing one or more themes that refer to one or more of a concept that encompasses one or more other concepts, another theme that encompasses one or more concepts that are associated with two or more themes, or a compound theme that includes one or more sub-themes;
generating one or more thematic scores for the one or more entities based on the one or more themes and the one or more scoring models and the data graph that are associated with the at least portion of the one or more concepts, wherein the one or more thematic scores include one or more values that quantify each relationship between the one or more concepts and the one or more entities, and wherein an entity with a higher thematic score value for a concept has a relationship strength value that exceeds another relationship strength value for another entity with a lower thematic score value for the concept;
providing one or more user interfaces having tools to search for one or more organizations based on selection of at least one theme that is associated with one or more concepts having a number of mentions above a threshold value; and
providing a report that includes the one or more thematic scores, the one or more entities, and the one or more concepts.

14. The network computer of claim 13, wherein generating the one or more thematic scores, further comprises, traversing the data graph to determine the one or more entities that are related to the one or more concepts based on one or more relationships represented in the data graph, wherein the one or more thematic scores are based on the strength of relationship between each entity and each concept.

15. The network computer of claim 13, wherein providing the one or more entities, further comprises, providing one or more portfolios that include the one or more entities, wherein each included entity contributes one or more partial thematic scores based on the one or more scoring models.

16. The network computer of claim 13, wherein providing the one or more concepts, further comprises:
providing a theme based on an anchor concept; and
traversing a concept graph to determine the one or more concepts based on one or more relationships between the one or more concepts and the anchor concept, wherein each relationship between the anchor concept and the one or more concepts is associated with each relationship strength value that exceeds a threshold value.

17. The network computer of claim 13, wherein providing the report that includes the one or more thematic scores, further comprises, displaying a value that quantifies a strength of each relationship between the one or more entities and the one or more concepts.

18. The network computer of claim 13, wherein providing the one or more thematic scores, further comprises:
employing the one or more scoring models to provide one or more sub-scores for each thematic score based on a weighting that corresponds to a contribution of the one or more sub-scores to the one or more thematic scores; and
generating one or more score containers that each include one or more values for the one or more weighted sub-scores that correspond to the one or more entities.

19. A processor readable non-transitory storage media that includes instructions for managing data, wherein execution of the instructions by one or more hardware processors performs actions, comprising:
providing a data graph based on one or more knowledge graphs and information provided by one or more data sources;
providing one or more concepts and one or more entities based on the data graph;
determining one or more scoring models based on the one or more concepts and the one or more entities;
providing one or more themes that refer to one or more of a concept that encompasses one or more other concepts, another theme that encompasses one or more concepts that are associated with two or more themes, or a compound theme that includes one or more sub-themes;
generating one or more thematic scores for the one or more entities based on the one or more themes and the one or more scoring models and the data graph that are associated with the at least portion of the one or more concepts, wherein the one or more thematic scores include one or more values that quantify each relationship between the one or more concepts and the one or more entities, and wherein an entity with a higher thematic score value for a concept has a relationship strength value that exceeds another relationship strength value for another entity with a lower thematic score value for the concept;
providing one or more user interfaces having tools to search for one or more organizations based on selection of at least one theme that is associated with one or more concepts having a number of mentions above a threshold value; and providing a report that includes the one or more thematic scores, the one or more entities, and the one or more concepts.

20. The media of claim 19, wherein generating the one or more thematic scores, further comprises, traversing the data graph to determine the one or more entities that are related to the one or more concepts based on one or more relationships represented in the data graph, wherein the one or more thematic scores are based on the strength of relationship between each entity and each concept.

21. The media of claim 19, wherein providing the one or more entities, further comprises, providing one or more portfolios that include the one or more entities, wherein each included entity contributes one or more partial thematic scores based on the one or more scoring models.

22. The media of claim 19, wherein providing the one or more concepts, further comprises:
   providing a theme based on an anchor concept; and
   traversing a concept graph to determine the one or more concepts based on one or more relationships between the one or more concepts and the anchor concept, wherein each relationship between the anchor concept and the one or more concepts is associated with each relationship strength value that exceeds a threshold value.

23. The media of claim 19, wherein providing the report that includes the one or more thematic scores, further comprises, displaying a value that quantifies a strength of each relationship between the one or more entities and the one or more concepts.

24. The media of claim 19, wherein providing the one or more thematic scores, further comprises:
   employing the one or more scoring models to provide one or more sub-scores for each thematic score based on a weighting that corresponds to a contribution of the one or more sub-scores to the one or more thematic scores; and
   generating one or more score containers that each include one or more values for the one or more weighted sub-scores that correspond to the one or more entities.

* * * * *